United States Patent
Ikoshi

(10) Patent No.: US 8,491,114 B2
(45) Date of Patent: Jul. 23, 2013

(54) INK COMPOSITION, INK SET AND IMAGE FORMING METHOD

(75) Inventor: Masao Ikoshi, Kanagawa (JP)

(73) Assignee: FIJIFILM Corporation, Tokyo (JP)

( * ) Notice: Subject to any disclaimer, the term of this patent is extended or adjusted under 35 U.S.C. 154(b) by 218 days.

(21) Appl. No.: 13/047,823

(22) Filed: Mar. 15, 2011

(65) Prior Publication Data

US 2011/0227996 A1     Sep. 22, 2011

(30) Foreign Application Priority Data

Mar. 18, 2010  (JP) ................................ 2010-063143

(51) Int. Cl.
    *G01D 15/06*    (2006.01)
(52) U.S. Cl.
    USPC ......................................................... 347/100
(58) Field of Classification Search
    USPC ................. 347/43, 95, 100; 106/31.86, 31
    See application file for complete search history.

(56) References Cited

U.S. PATENT DOCUMENTS

| | | | |
|---|---|---|---|
| 3,361,582 A | 1/1968 | Lewis | |
| 5,919,291 A * | 7/1999 | Hotomi et al. | 106/15.05 |
| 7,296,883 B2 * | 11/2007 | Kanaya et al. | 347/100 |
| 7,604,339 B2 * | 10/2009 | Yamashita et al. | 347/100 |
| 8,101,012 B2 * | 1/2012 | Grant et al. | 106/31.49 |
| 8,398,762 B2 * | 3/2013 | Valentini et al. | 106/31.86 |

FOREIGN PATENT DOCUMENTS

| | | |
|---|---|---|
| EP | 1193078 A | 4/2002 |
| JP | 9-279074 A | 10/1997 |
| JP | 2003-165936 A | 6/2003 |

* cited by examiner

*Primary Examiner* — Lamson Nguyen
(74) *Attorney, Agent, or Firm* — SOLARIS Intellectual Property Group, PLLC

(57) ABSTRACT

An inkjet ink composition includes a water-soluble alkali-metal silicate salt, urea, a colorant and water. An ink set includes the inkjet ink composition, and a treatment liquid capable of forming an aggregate when contacting the inkjet ink composition. An inkjet image forming method includes an ink ejection process of ejecting the inkjet ink composition from an inkjet head equipped with a silicone nozzle plate onto a recording medium, to form an image.

22 Claims, 2 Drawing Sheets

INK COMPOSITION, INK SET AND IMAGE FORMING METHOD

CROSS-REFERENCE TO RELATED APPLICATION

This application is based on and claims priority under 35 USC 119 from Japanese patent Application No. 2010-063143 filed on Mar. 18, 2010, the disclosure of which is incorporated by reference herein.

BACKGROUND

1. Technical Field

The present invention relates to an ink composition, an ink set and an image forming method.

2. Related Art

In recent years, inkjet recording methods have rapidly been spreading due to advantages such as compactness of the main apparatus and low noise. There is a type of inkjet printer used for inkjet recording methods, in which glass or silicone is used for members thereof in consideration of ease of micro-processing, processing accuracy and processes.

Inks used for an inkjet printer of this type generally contain a colorant that is dispersible or dissolvable in a solvent, a moistening agent and an aqueous medium. When such an ink is filled into an inkjet printer in which the members containing glass or silicone are used, and are used or left for a long time, there are cases in which glass or silicone contacting the ink is dissolved. Therefore, there are cases in which the design accuracy of the inkjet printer is decreased, and the image quality is decreased.

In order to solve these problems, for example, an aqueous ink composition containing a phosphonium compound, a silicate ion and a pigment that is dispersed using a surfactant is disclosed (refer to, for example, Japanese Patent Application Laid-Open (JP-A) No. 2003-165936). Further, an ink composition containing a water-soluble dye and containing alkali silicate as a water-soluble mildewcide is disclosed (refer to, for example, JP-A No. 9-279074).

SUMMARY

However, the aqueous ink composition described in JP-A No. 2003-165936 is not fully satisfactory in terms of ink stability and maintainability of inkjet heads, in some cases. Further, the aqueous ink composition described in JP-A No. 9-279074 is not fully satisfactory in terms of light fastness and resistance to water.

An object of the present invention is provision of an inkjet ink composition, which has excellent ink stability and inkjet head maintainability and with which a reduction in the liquid repellency of inkjet head members is suppressed, an ink set including the inkjet ink composition, and an inkjet image forming method.

Aspects of the invention include the following:

<1> An inkjet ink composition comprising a water-soluble alkali-metal silicate salt, urea, a colorant and water.

<2> The inkjet ink composition according to <1>, wherein a content ratio of the urea to the water-soluble alkali-metal silicate salt (urea/alkali-metal silicate salt) is from 5 to 1000.

<3> The inkjet ink composition according to <1> or <2>, wherein the alkali-metal silicate salt is represented by the following Formula (S):

$$x(M_2O) \cdot y(SiO_2) \quad (S)$$

wherein, in Formula (S), M represents sodium or potassium, x represents 1 or 2, and y represents an integer of from 1 to 4.

<4> The inkjet ink composition according to any one of <1> to <3>, wherein the colorant is a pigment that has been covered with a water-insoluble resin using a phase inversion emulsification method.

<5> The inkjet ink composition according to any one of <1> to <4>, wherein a content of the alkali-metal silicate salt is from 0.0001% by mass to 3.0% by mass relative to an entire mass of the inkjet ink composition.

<6> The inkjet ink composition according to any one of <1> to <5>, wherein the inkjet ink composition has a pH value of from 7.5 to 10.0 at 25° C.

<7> The inkjet ink composition according to any one of <1> to <6>, wherein a content of the urea is from 1% by mass to less than 15% by mass relative to an entire mass of the inkjet ink composition.

<8> The inkjet ink composition according to any one of <1> to <7>, further comprising resin particles.

<9> The inkjet ink composition according to <8>, wherein the resin particles are self-dispersing polymer particles.

<10> The inkjet ink composition according to any one of <1> to <9>, wherein the alkali-metal silicate salt is at least one selected from sodium silicate or potassium silicate, and a total content of sodium silicate and potassium silicate is from 0.001% by mass to 0.2% by mass relative to an entire mass of the inkjet ink composition.

<11> The inkjet ink composition according to any one of <1> to <10>, wherein a content of the alkali-metal silicate salt is from 0.03% by mass to 0.2% by mass relative to an entire mass of the inkjet ink composition, and a content of the urea is from 3.0% by mass to 10% by mass relative to the entire mass of the inkjet ink composition.

<12> The inkjet ink composition according to any one of <1> to <11>, wherein a content ratio of the urea to the water-soluble alkali-metal silicate salt (urea/alkali-metal silicate salt) is from 20 to 200.

<13> An ink set comprising the inkjet ink composition of any one of <1> to <12>, and a treatment liquid capable of forming an aggregate when contacting the inkjet ink composition.

<14> An inkjet image forming method comprising an ink ejection process of ejecting the inkjet ink composition of any one of <1> to <12> from an inkjet head equipped with a silicone nozzle plate onto a recording medium, to form an image.

<15> The inkjet image forming method according to <14>, further comprising a treatment liquid application process of applying a treatment liquid, which is capable of forming an aggregate when contacting the inkjet ink composition, onto the recording medium.

DESCRIPTION OF EMBODIMENTS

<Inkjet Ink Composition>

Figure 1:
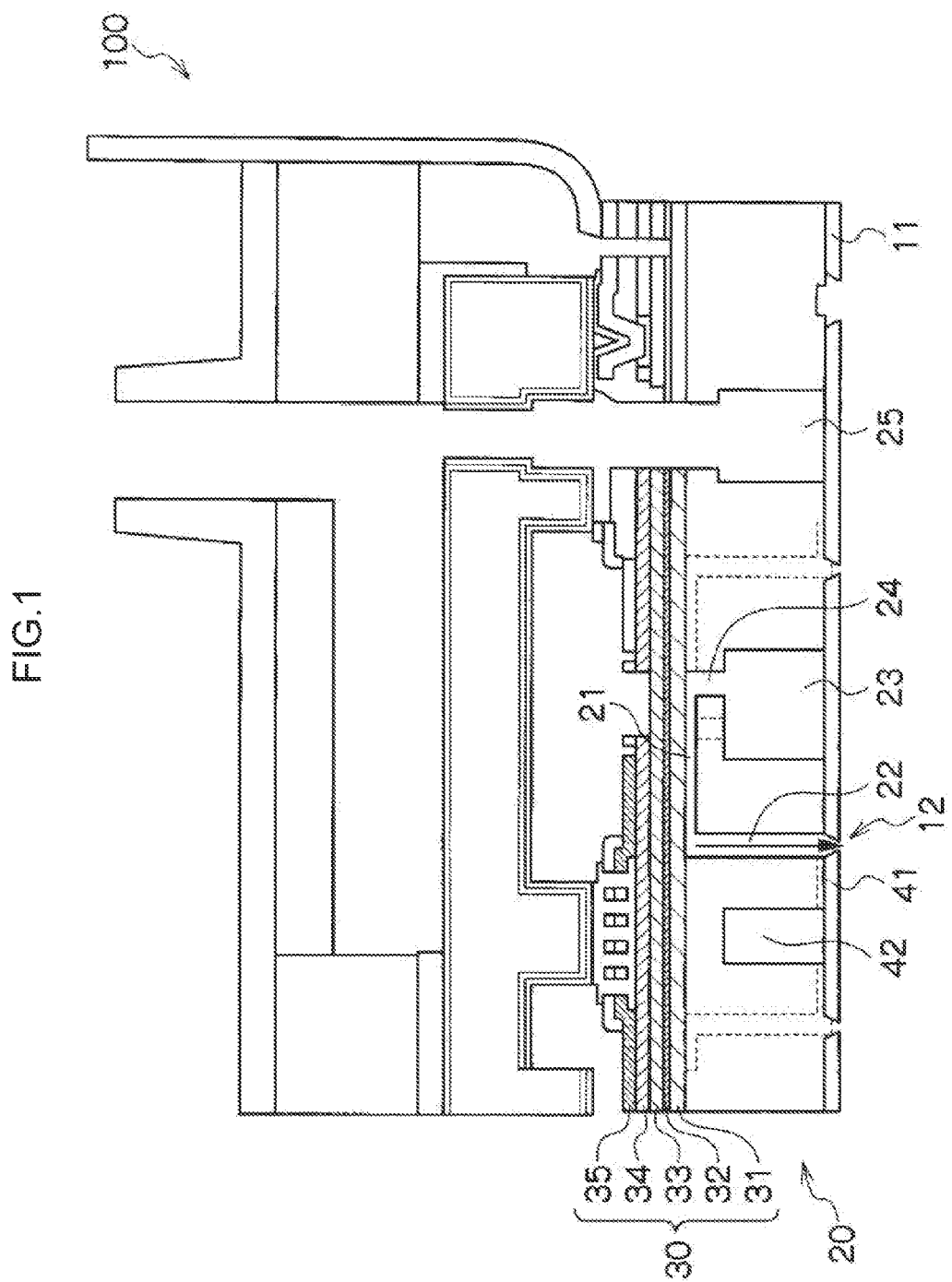
FIG. 1 is a schematic cross-sectional view illustrating an example of the internal structure of an inkjet head.

The inkjet ink composition according to the invention (hereinafter sometimes simply referred to as "ink composition") includes at least one water-soluble alkali-metal silicate salt, urea, at least one colorant and water, and may further include other components, as necessary.

Due to this configuration, the ink composition according to the invention has excellent ink stability, and provides excellent maintainability of inkjet heads; further, when the ink composition is used, a reduction in liquid repellency of inkjet head members can be suppressed.

In general, members that constitute an inkjet head are provided with liquid repellency in order to maintain the ink ejection performance. The liquid repellency can be imparted by, for example, treating member surfaces with a fluorine-type surface treatment agent. The liquid repellency of inkjet head members is known to gradually decrease when the inkjet head is used for a long time. Inks containing a pigment as a colorant tend to cause a larger reduction in the liquid repellency.

There are cases in which a nozzle plate is configured to include silicone or the like in order to precisely form particularly minute nozzles (ink ejection ports). The reduction of liquid repellency of the nozzle plate sometimes affects ink ejection properties, also in the case of an inkjet head equipped with the silicon nozzle plate.

The inkjet ink composition according to the invention can more effectively suppress a reduction in the liquid repellency of inkjet head members, even in cases in which the ink composition is used in an inkjet head equipped with the nozzle plate formed of slicone or the like.

Components of an ink adhere to an inkjet head or the like, depending on the conditions of use thereof. This causes a reduction in ink ejection properties in some cases. Therefore, maintenance whereby the adhered ink components are removed is performed in some cases. In contrast, the ink composition according to the invention exhibits excellent removability of adhered ink components, and has excellent maintainability, due to the above configuration of the ink composition according to the invention.

[Alkali-Metal Silicate Salt]

The inkjet ink composition according to the invention includes at least one water-soluble alkali-metal silicate salt. The water-soluble alkali-metal silicate salt may be, without particular limitation, any water-soluble alkali-metal silicate salt that is composed of silicic acid and an alkali metal, and that has water-solubility. The water-soluble alkali-metal silicate salt may be an alkali-metal salt of metasilicic acid, an alkali-metal salt of orthosilicic acid, or the like, and may be a mixture thereof.

In the invention, the water-soluble alkali-metal silicate salt is an alkali-metal salt of silicic acid. A salt of silicic acid with a cationic substance other than alkali metal, such as an ammonium salt of silicic acid (e.g., tetramethylammonium salt of silicic acid), causes a reduction in ink dispersion stability in some cases. Further, odor may be generated over time when ammonium salts or the like which can generate a volatile compound are used.

Specifically, the alkali-metal silicate salt is preferably at least one compound represented by the following Formula (S).

$$x(M_2O) \cdot y(SiO_2) \tag{S}$$

In Formula (S), M represents sodium or potassium, x represents 1 or 2, and y represents an integer of from 1 to 4. The alkali-metal silicate salt represented by Formula (S) is referred to as alkali-metal metasilicate salt in the case of $x=1$, $y=1$, and is referred to as alkali-metal orthosilicate salt in the case of $x=2$, $y=1$, each of which is an alkali-metal silicate salt having water-solubility.

In general, an alkali-metal silicate salt is often a mixture of two or more compounds each of which is represented by Formula (S). The alkali-metal silicate salt employed in the invention may be a single compound represented by Formula (S), or a mixture of two or more compounds represented by Formula (S). In other words, the inkjet ink composition may include only one compound represented by Formula (S), or include two or more compounds each represented by Formula (S).

In the invention, the water-soluble alkali-metal silicate salt may be a commercially-available compound (such as liquid glass), or a product obtained by fusing silicic acid and a carbonate or hydroxide of an alkali metal. From the viewpoint of ink dispersion stability, it is preferable to use sodium silicate or potassium silicate, each of which is a commercially-available compound.

The content ratio of alkali-metal silicate salt in the inkjet ink composition according to the invention is not particularly limited. From the viewpoint of suppressing a reduction of liquid repellency, the content ratio of alkali-metal silicate salt in the inkjet ink composition according to the invention is preferably from 0.0001 to 3.0% by mass, more preferably from 0.001 to 0.2% by mass, and further preferably from 0.01 to 0.1% by mass, relative to the entire mass of the ink composition. An alkali-metal silicate salt content within the above range enables effective suppression of a reduction in liquid repellency.

From the viewpoints of suppression of a reduction in liquid repellency of inkjet head members and ink dispersion stability, the ink composition according to the invention preferably includes at least one alkali-metal silicate salt represented by Formula (S) in an (total) amount of from 0.0001 to 3.0% by mass relative to the entire mass of the ink composition, and more preferably includes at least one selected from sodium silicate or potassium silicate in an (total) amount of from 0.001 to 0.2% by mass relative to the entire mass of the ink composition.

[Urea]

The ink composition according to the invention includes urea. Since urea has high moisturizing function, urea serving as a solid humectant is capable of effectively suppressing undesired drying and coagulation of the ink. In the invention, inclusion of urea in addition to the alkali-metal silicate salt more effectively improves the maintainability of inkjet heads.

From the viewpoint of, for example, improving the maintainability (wiping-off properties), the content of urea in the ink composition according to the invention is preferably from 1% by mass to 20% by mass, more preferably from 1% by mass to 15% by mass, and still more preferably from 3% by mass to 10% by mass, relative to the entire mass of the ink composition.

The ratio of the content of urea to the content of the alkali-metal silicate salt in the ink composition according to the invention is not particularly limited, and the content ratio of urea to the alkali-metal silicate salt (urea/alkali-metal silicate salt) is preferably from 5 to 1000, more preferably from 10 to 500, and still more preferably from 20 to 200.

The combination of the urea content and the alkali-metal silicate salt content is not particularly limited, and the following combinations are preferable from the viewpoint of more effectively achieving both wiping-off properties and image fixability.

Specifically, a combination of a urea content of 1.0% by mass or higher and an alkali-metal silicate salt content of 0.01% by mass or higher is preferable, a combination of a urea content of from 1.0% by mass to 20% by mass and an alkali-metal silicate salt content of from 0.02% by mass to 0.5% by mass is more preferable, and a combination of a urea content of from 3.0% by mass to 10% by mass and an alkali-metal silicate salt content of from 0.03% by mass to 0.2% by mass is particularly preferable.

(Solid Humectant)

The ink composition according to the invention may further include a solid humectant other than urea. As used in the invention, solid humectant refers to a water-soluble compound that has water-retention function and that is solid at 25° C.

Solid humectants that are generally used in aqueous ink compositions can be used, as they are, as the solid humectant in the invention. More specifically, examples of solid humectants that can be used include urea derivatives, sugars, sugar alcohols, hyaluronic acids, and polyhydric alcohols such as trimethylolpropane and 1,2,6-hexanetriol.

Examples of the urea derivatives include: a compound obtained by replacing at least one hydrogen on at least one nitrogen atom of urea by at least one alkyl group or at least one alkanol group; thiourea; and a compound obtained by replacing at least one hydrogen atom on at least one nitrogen atom of thiourea by at least one alkyl group or at least one alkanol group. When there are two or more alkyl groups on the at least one nitrogen atom of urea or thiourea, the alkyl groups may be bonded to each other to form a ring.

Specific examples of the urea derivatives include N,N-dimethylurea, thiourea, ethyleneurea, hydroxyethylurea, hydroxybutylurea, ethylenethiourea and diethylthiourea.

Examples of the sugars include monosaccharides, disaccharides, oligosaccharides (including trisaccharides and tetrasaccharides) and polysaccharides, and specific examples thereof include glucose, mannose, fructose, ribose, xylose, arabinose, galactose, aldonic acids, glucitol, maltose, cellobiose, lactose, sucrose, trehalose and maltotriose. As used herein, polysaccharides are included in sugars in a broad sense, and include substances that widely occur in nature, such as alginic acids, α-cyclodextrin and cellulose. Further, examples of derivatives of these sugars include reducing sugars (such as sugar alcohols) of the above sugars, and oxidized sugars (such as aldonic acids, uronic acids, amino acids and thiosugars) of the above sugars. Sugar alcohols are particularly preferable, and specific examples thereof include maltitol, sorbitol and xylitol. As the hyaluronic acids, a product that is commercially available as sodium hyaluronate 1% aqueous solution (molecular weight: 350,000) may be used.

[Colorant]

The ink composition according to the invention includes at least one colorant. Known dyes, known pigments and the like can be used as the colorant. In particular, the colorant is preferably a colorant that is nearly insoluble in water or hardly soluble in water, from the viewpoint of ink spotting properties. Specifically, examples of the colorant include various pigments, disperse dyes, oil-soluble dyes, and dyes capable of forming J-aggregates. The colorant is more preferably a pigment.

In the invention, a water-insoluble pigment or a pigment surface-treated with a dispersant may itself be used as the colorant.

The type of pigment in the invention is not particularly limited, and conventional known organic and inorganic pigments may be used without particular restrictions. Examples of thereof include: polycyclic pigments such as azo lake, azo pigments, phthalocyanine pigments, perylene and perynone pigments, anthraquinone pigments, quinacridone pigments, dioxazine pigments, diketopyrrolopyrrole pigments, thioindigo pigments, isoindolinone pigments and quinophthalone pigments; dye lakes such as basic dye lake and acidic dye lake; organic pigments such as nitro pigments, nitroso pigments, aniline black and daylight fluorescent pigments; and inorganic pigments such as titanium oxide, iron oxide pigments and carbon black. Any pigment capable of being dispersed in an aqueous phase may be used, even if the pigment is not described in Color Index. A pigment that has been subjected to surface-treatment with a surfactant, a polymer dispersant or the like, graft carbon, and the like are also usable, as a matter of course. Among these pigments, use of an azo pigment, a phthalocyanine pigment, an anthraquinone pigment, a quinacridone pigment or carbon black pigment is particularly preferable.

Specifically, examples of pigments that can be used in the invention include pigments described in paragraphs [0142] to [0145] of JP-A No. 2007-100071.

A pigment that can stably exist in the ink composition can be used as the above pigment. The pigment is preferably a water-dispersible pigment from the viewpoints of, for example, light fastness and dispersion stability.

Specific examples of the water-dispersible pigment include the following pigments (1) to (4).

(1) An encapsulated pigment, which is a polymer emulsion formed by polymer particles containing a pigment. More specifically, the encapsulated pigment is a pigment that is made dispersible in water by covering at least a part of the surface of the pigment with a water-insoluble polymer wherein the polymer layer formed on the surface of the pigment hydrophilize the pigment.

(2) A self-dispersing pigment, which has at least one type of hydrophilic group at a surface thereof and which exhibits water-dispersibility in the absence of a dispersant. More specifically, the self-dispersing pigment is a pigment that is itself made dispersible in water by hydrophilizing mainly carbon black or the like by surface oxidation treatment.

(3) A resin-dispersed pigment, which is a pigment dispersed using a water-soluble polymer compound having a weight-average molecular weight of 50,000 or less.

(4) A surfactant-dispersed pigment, which is a pigment dispersed using a surfactant.

In the present invention, preferable examples of the pigment include (1) encapsulated pigment and (2) self-dispersing pigment, and particularly preferable examples of the pigment include (1) encapsulated pigment.

(Encapsulated Pigment)

The colorant in the invention is preferably a pigment of which at least a part of a surface thereof is covered with a water-insoluble resin (encapsulated pigment).

The water-insoluble resin (hereinafter sometimes referred to as "dispersant" or "water-insoluble polymer dispersant") may be, without particular limitation, any resin that is a water-insoluble polymer and that makes the pigment dispersible. Conventional known water-insoluble resins can be used as the water-insoluble resin. The water-insoluble resin may be configured to include both a hydrophobic structural unit and a hydrophilic structural unit.

Examples of the monomer for forming the hydrophobic structural unit include styrenic monomers, alkyl (meth)acrylates and aromatic-group-containing (meth)acrylates.

The monomer for forming the hydrophilic structural unit may be, without particular limitation, any monomer that includes a hydrophilic group. Examples of the hydrophilic group include a nonionic group, a carboxyl group, a sulfonic acid group and a phosphoric acid group. The nonionic group has the same definition and preferable definitions as that of the nonionic group of the self-dispersing polymer described below.

The hydrophilic structural units in the invention preferably include at least a carboxyl group, and more preferably include a nonionic group and a carboxyl group, from the viewpoint of dispersion stability. The nonionic group and the carboxyl group may be present in the same structural unit, or in different structural units.

Specific examples of the water-insoluble polymer dispersant include a styrene-(meth)acrylic acid copolymer, a styrene-(meth)acrylic acid-(meth)acrylic ester copolymer, a (meth)acrylic ester-(meth)acrylic acid copolymer, a polyethyleneglycol (meth)acrylate-(meth)acrylic acid copolymer, and a styrene-maleic acid copolymer.

Here, "(meth)acrylic acid" refers to acrylic acid or methacrylic acid.

In the invention, the water-insoluble polymer dispersant is preferably a vinyl polymer containing a carboxyl group, and more preferably a vinyl polymer containing at least a structural unit derived from an aromatic-group-containing monomer as a hydrophobic structural unit and containing at least a carboxyl-group-containing structural unit as a hydrophilic structural unit, from the viewpoint of pigment dispersion stability.

The weight average molecular weight of the water-insoluble polymer dispersant is preferably from 3,000 to 200,000, more preferably from 5,000 to 100,000, still more preferably from 5,000 to 80,000, and particularly preferably from 10,000 to 60,000, from the viewpoint of pigment dispersion stability.

The content of dispersant in the encapsulated pigment in the invention is preferably from 5 to 200% by mass, more preferably from 10 to 100% by mass, and particularly preferably from 20 to 80% by mass, relative to the pigment, from the viewpoints of pigment dispersibility, ink spotting properties and dispersion stability.

When the content of dispersant in the encapsulated pigment is within the above range, the pigment is covered with an appropriate amount of dispersant, and there is a higher tendency for an encapsulated pigment having a small particle diameter and excellent stability over time to be obtained. Therefore, a dispersant content within the above range is preferable.

The encapsulated pigment in the invention may include another dispersant, in addition to the water-insoluble polymer dispersant. For example, conventional known water-soluble low-molecular-weight dispersants and water-soluble polymers can be used. Dispersants other than the water-insoluble polymer dispersant may be used at a content that is within the above-described content range for dispersant.

Other additives, such as basic substances (neutralization agents) and surfactants, may be added to the encapsulated pigment, as necessary.

Neutralization agents (organic bases and inorganic alkalis) may be used as the basic substance. The basic substance is preferably added in order to neutralize the dispersant such that the dispersant-containing composition becomes to have a pH of from 7 to 11, and more preferably added such that the dispersant-containing composition becomes to have a pH of from 8 to 10.

The content of basic substance is preferably from 50 to 150% by mol, more preferably from 70 to 120% by mol, and particularly preferably from 80 to 100% by mol, relative to 100% by mol of ionic groups of dispersant.

Specific examples of the basic substance are the same as the below-described specific examples of the basic substance for the self-dispersing polymer particles.

—Production Method of Pigment Dispersion—

The encapsulated pigment in the invention can be prepared as a pigment dispersant by, for example, dispersing a mixture that contains a pigment and a dispersant, and optionally contains a solvent (preferably an organic solvent) or the like, using a disperser or the like.

The pigment dispersion in the invention is preferably produced by mixing a solution which contains a pigment, a dispersant, an organic solvent capable of dissolving or dispersing the dispersant, and a basic substance, and of which the main component is water (mixing-hydration process), and thereafter removing the organic solvent (solvent removal process).

According to this method of producing a pigment dispersion, a pigment dispersion in which the encapsulated pigment is finely dispersed, and which has excellent storage stability can be produced.

The organic solvent in the method of producing a pigment dispersion is capable of dissolving or dispersing the dispersant in the invention; in addition, the organic solvent preferably has a certain degree of affinity for water. Specifically, the organic solvent is preferably a solvent of which the solubility in water at 20° C. is from 10% by mass to 50% by mass.

More specifically, the pigment dispersion in the invention can be produced by a production method including the following processes (1) and (2). However, the production method is not limited thereto.

Process (1): a process of subjecting a mixture containing a pigment, a dispersant, an organic solvent capable of dissolving/dispersing the dispersant, a basic substance and water to dispersing treatment;

Process (2): a process of removing at least a part of the organic solvent from the mixture after dispersing treatment.

In the process (1), first, the dispersant is dissolved or dispersed in the organic solvent, thereby obtaining a mixture thereof (mixing process). Then, a pigment, a solution which contains a basic substance and contains water as the main component, water, and, optionally, a surfactant or the like, are added to the mixture, followed by mixing and dispersing treatment, thereby obtaining an oil-in-water type pigment dispersion.

The amount of the basic substance to be added (neutralization degree) is not particularly limited. Usually, the liquid property of the encapsulated pigment dispersion finally obtained is preferably close to neutral, for example a pH (25° C.) of from 4.5 to 10. The target pH may be set based on the neutralization degree that suits the dispersant.

The pigment, dispersant and other additives used in the method of producing a pigment dispersion respectively have the same definitions as the pigment, dispersant and other additives described in the above section for the encapsulated pigment, and preferable examples thereof are also the same.

Preferable examples of the organic solvent used in the invention include alcohol solvents, ketone solvents and ether solvents. Among them, examples of alcohol solvents include ethanol, isopropanol, n-butanol, tertiary butanol, isobutanol and diacetone alcohol. Examples of ketone solvents include acetone, methyl ethyl ketone, diethyl ketone and methyl isobutyl ketone. Examples of ether solvent s include dibutyl ether, tetrahydrofuran and dioxane. Among these solvents, isopropanol, acetone and methyl ethyl ketone are preferable, and methyl ethyl ketone is particularly preferable.

The organic solvent may be used singly, or in combination of two or more thereof.

In the production of the pigment dispersion, kneading-dispersing treatment may be performed while applying a strong shearing force by using, for example, a two-roll mill, a three-roll mill, a ball mill, a trommel, a disper, a kneader, a cokneader, a homogenizer, a blender, or a monoaxial or biaxial extruder.

Specifics of the kneading and dispersing are described in "Paint Flow and Pigment Dispersion", authored by T. C. Patton (published by John Wiley and Sons Co. 1964) and the like.

In the production of the pigment dispersion, fine dispersing treatment with beads having a particle diameter of from 0.01 mm to 1 mm and made of glass, zirconia or the like, may be conducted, as necessary, using a vertical or horizontal sand grinder, a pin mill, a slit mill, an ultrasonic disperser or the like.

In the method of producing a pigment dispersion according to the invention, the manner of removal of organic solvent is not particularly limited, and organic solvent can be removed by a known method such as distillation under reduced pressure.

The encapsulated pigment in the pigment dispersion thus obtained maintains excellent dispersion state, and the pigment dispersion obtained has excellent stability over time.

(Self-Dispersing Pigment)

A self-dispersing pigment is a pigment which is obtained by bonding many hydrophilic functional groups and/or salts thereof (hereinafter referred to as dispersibility-imparting groups) to a surface of a pigment directly, or indirectly via an alkyl group, an alkylether group, an aryl group or the like, and which is dispersible in an aqueous medium in the absence of a dispersant. The expression "dispersible in an aqueous medium in the absence of a dispersant" refers to a state of being dispersible in an aqueous solvent even when a dispersant for dispersing the pigment is not used.

An ink containing the self-dispersing pigment as a colorant does not need to contain a dispersant, such as those described above, that would be incorporated in order to disperse an ordinary pigment; therefore, foaming due to reduced defoaming properties caused by a dispersant hardly occurs, and an ink having excellent ejection stability can be easily prepared.

In the invention, a preferable example is a self-dispersing pigment surface-treated by oxidization treatment with a hypohalous acid and/or a hypohalous acid salt or oxidization treatment with ozone. Commercially available products are also usable as the self-dispersing pigment, and examples thereof include MICROJET CW-1 (tradename; manufactured by ORIENT CHEMICAL INDUSTRIES CO., LTD.), and CAB-O-JET200 and CAB-O-JET300 (tradenames; manufactured by Cabot Corporation).

In the invention, the average particle diameter of the pigment is preferably from 10 to 200 nm, more preferably from 10 to 150 nm, and still more preferably from 10 to 100 nm. When the average particle diameter is 200 nm or less, color reproducibility is excellent, and ink spotting characteristics are excellent in the case of an inkjet method. When the average particle diameter is 10 nm or more, light fastness is excellent.

The particle diameter distribution of the pigment is not particularly limited, and may be a broad particle diameter distribution or a monodisperse particle diameter distribution. Two or more types of pigment each having a monodisperse particle diameter distribution may be mixed and used.

The average particle diameter and particle diameter distribution of the pigment can be measured using, for example, a dynamic light scattering method.

In the ink composition according to the invention, the pigment may be used singly, or in combination of two or more thereof.

From the viewpoint of image density, the content of pigment in the ink composition is preferably from 0.1 to 25% by mass, more preferably from 1 to 20% by mass, and still more preferably from 1.5 to 15% by mass, and particularly preferably from 1.5 to 10% by mass, relative to the entire mass of the ink composition.

In the ink composition according to the invention, the mass ratio of alkali-metal silicate salt to the water-insoluble resin (alkali-metal silicate salt/water-insoluble resin) is preferably from 0.0001 to 0.5, more preferably from 0.0001 to 0.3, and still more preferably from 0.001 to 0.05, from the viewpoints of ink dispersion stability and suppression of a reduction in liquid repellency of inkjet head members.

From the viewpoints of dispersion stability and ejection reliability of the ink, light fastness and rubbing resistance of an image formed, and suppression of a reduction in liquid repellency of inkjet head members, it is preferable that the ink composition according to the invention includes at least one water-insoluble resin having an acid value of from 30 to 100 mgKOH/g and at least one alkali-metal silicate salt represented by Formula (S) wherein the ratio of the total mass of the at least one alkali-metal silicate salt represented by Formula (S) to the total mass of the at least one water-insoluble resin having an acid value of from 30 to 100 mgKOH/g (the total mass of the at least one alkali-metal silicate salt represented by Formula (S)/the total mass of the at least one water-insoluble resin having an acid value of from 30 to 100 mgKOH/g) is preferably from 0.0001 to 0.3, and it is more preferable that the ink composition includes at least one water-insoluble resin having an acid value of from 50 to 85 mgKOH/g and at least one of sodium silicate or potassium silicate wherein the mass ratio of the total mass of sodium silicate and potassium silicate to the total mass of the at least one water-insoluble resin having an acid value of from 50 to 85 mgKOH/g (the total mass of sodium silicate and potassium silicate/the total mass of the at least one water-insoluble resin having an acid value of from 50 to 85 mgKOH/g) is from 0.001 to 0.05.

(Water-Soluble Organic Solvent)

The inkjet ink composition according to the invention includes a medium including at least water, and preferably includes, in addition to water, at least one water-soluble organic solvent. The water-soluble organic solvent is used as an anti-drying agent, a humectant, a penetration promoter or the like.

The anti-drying agent is able to effectively prevent clogging of nozzles that may occur due to drying of ink at ink ejection ports. The anti-drying agent is preferably a water-soluble organic solvent having a vapor pressure that is lower than that of water.

Specific examples of the anti-drying agent include: a polyhydric alcohol such as ethylene glycol, propylene glycol, diethylene glycol, polyethylene glycol, thiodiglycol, dithiodiglycol, 2-methyl-1,3-propandiol, 1,2,6-hexanetriol, acetylene glycol derivatives, glycerin or trimethylolpropane; a lower alkyl ether of a polyhydric alcohol such as ethylene glycol monomethyl (or monoethyl)ether, diethylene glycol monomethyl (or monoethyl)ether or triethylene glycol monoethyl (or monobutyl)ether; a heterocyclic compound such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among these, a polyhydric alcohol such as glycerin or diethylene glycol is preferable as an anti-drying agent. The anti-drying agent may be used singly, or in combination of two or more thereof. The anti-drying agent may be contained in the ink composition at a content of preferably from 10% by mass to 50% by mass relative to the entire mass of the ink composition.

The penetration promoter is preferably used in order to allow the ink composition to penetrate into a recording medium (such as a printing sheet) well.

Specific examples of penetration promoters that can suitably be used include: alcohols such as ethanol, isopropanol, butanol, di(or tri)ethylene glycol monobutyl ether and 1,2-hexanediol; sodium lauryl sulfate; sodium oleate; and non-ionic surfactants.

The content of penetration promoter in the ink composition is preferably from 5% by mass to 30% by mass, at which effects of the penetration promoter is sufficiently exerted. The amount of penetration promoter added is preferably within a range in which bleeding of a printed image or print through does not occur.

The water-soluble organic solvent may be used for purposes other than the above, and may be used in order to, for example, adjust viscosity. Specific examples of water-soluble organic solvents that can be used for adjusting viscosity include: alcohols (such as methanol, ethanol, propanol, isopropanol, butanol, isobutanol, sec-butanol, t-butanol, pentanol, hexanol, cyclohexanol and benzyl alcohol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol); glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether); amines (such as ethanolamine, diethanolamine, triethanolamine, N-methyl diethanolamine, N-ethyl diethanolamine, morpholine, N-ethyl morpholine, ethylenediamine, diethylenetriamine, triethylenetetramine, polyethylene imine and tetramethyl propylenediamine); and other polar solvents (such as formamide, N,N-dimethylformamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvent in the inkjet ink composition according to the invention may be used singly, or in combination of two or more thereof. From the viewpoints of stability and ejection properties, the content of water-soluble organic solvent is preferably from 1% by mass to 60% by mass, more preferably from 5% by mass to 40% by mass, and particularly preferably from 10% by mass to 30% by mass, relative to the entire mass of the ink composition.

The content of water in the inkjet ink composition according to the invention is not particularly limited, and is preferably from 10% by mass to 99% by mass, more preferably from 30% by mass to 80% by mass, and still more preferably from 50% by mass to 70% by mass, relative to the entire mass of the inkjet ink composition, from the viewpoint of ensuring stability and ejection reliability.

(Resin Particle)

The ink composition according to the invention preferably includes at least one type of resin particle from the viewpoints of fixability, resistance to rubbing, and coagulation properties. The resin particle is more preferably a self-dispersing polymer particle containing a structural unit derived from a hydrophilic monomer and a structural unit derived from a hydrophobic monomer. The expression " . . . structural unit . . . derived from . . . (A)" used herein means a component in a polymer which component is formed by the binding of (A) to an adjacent structural unit or units.

In the invention, the self-dispersing polymer refers to a water-insoluble polymer that can get into a dispersed state in an aqueous medium due to a functional group (particularly, an acidic group or a salt thereof) of the polymer itself, when dispersed by a phase inversion emulsification method in the absence of surfactant.

Here, the dispersed state encompasses both of an emulsified state (emulsion) in which a water-insoluble polymer in the liquid state is dispersed in an aqueous medium and a dispersed state (suspension) in which a water-insoluble polymer in the solid state is dispersed in an aqueous medium.

The self-dispersing polymer in the invention is preferably a self-dispersing polymer that can get into a dispersed state in which the water-insoluble polymer is dispersed in the solid state, from the viewpoint of ink fixability of an ink composition containing the self-dispersing polymer.

The method of preparing an emulsified or dispersed state of the self-dispersing polymer, e.g., an aqueous dispersion of the self-dispersing polymer, may be a phase inversion emulsification method. The phase inversion emulsification method may be, for example, a method including: dissolving or dispersing a self-dispersing polymer in a solvent (such as a hydrophilic organic solvent); thereafter pouring the resultant into water without adding a surfactant; agitating and mixing the resultant in a state in which the salt-forming groups (such as acidic groups) that the self-dispersing polymer has are neutralized; and removing the solvent, thereby obtaining an aqueous dispersion in the emulsified or dispersed state.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralization agent that can neutralize the salt-forming groups of the water-insoluble polymer to a degree of 100% (the neutralization agent being sodium hydroxide if the salt-forming groups are anionic, or acetic acid if the salt-forming groups are cationic), the mixture is agitated with an agitator having a stirring blade at a rotation rate of 200 rpm at 25° C. for 30 minutes, and the organic solvent is removed from the mixture liquid. If a stable emulsification or dispersion state of the water-insoluble polymer in the mixture liquid is maintained and occurrence of precipitation is not confirmed by visual observation at 25° C. for at least one week after the removal of the organic solvent, the water-insoluble polymer is considered to be a self-dispersing polymer.

The stability of an emulsification or dispersion state of the self-dispersing polymer can be confirmed also by an accelerated test of precipitation using centrifugal separation. In the accelerated test of precipitation using centrifugal separation, the stability can be evaluated by, for example, adjusting the aqueous dispersion of polymer particles obtained by the above method to a solids concentration of 25% by mass, performing centrifugal separation at 12,000 rpm for 1 hour, and measuring the solids concentration of the supernatant after centrifugal separation.

If the ratio of the solids concentration after centrifugal separation to the solids concentration before centrifugal separation is large (close to 1), precipitation of polymer particles by centrifugal separation does not occur; i.e., the aqueous dispersion of the polymer particles is more stable. In the invention, the ratio of the solids concentration after centrifugal separation to the solids concentration before centrifugal separation is preferably 0.8 or higher, more preferably 0.9 or higher, and particularly preferably 0.95 or higher.

The "water-insoluble polymer" refers to a polymer of which the dissolution amount when the polymer is dried at 105° C. for 2 hours and then dissolved in 100 g of water having a temperature of 25° C. is 10 g or less. The dissolution amount is preferably 5 g or less, and more preferably 1 g or less. The dissolution amount is a dissolution amount when the polymer has been 100% neutralized with either sodium hydroxide or acetic acid depending on the type of salt-forming groups of the water-insoluble polymer.

In the self-dispersing polymer in the invention, the content of water-soluble components that exhibit water-solubility when the self-dispersing polymer is in the dispersed state is preferably 10% by mass or lower, more preferably 8% by mass or lower, and still more preferably 6% by mass or lower. A water-soluble component content of 10% by mass or lower effectively suppresses swelling of the polymer particles and adhesion between the polymer particles, and can maintain a stable dispersion state. Further, an increase in the viscosity of the ink composition can be suppressed, and ejection stability improves.

Here, the water-soluble components refer to compounds with which the self-dispersing polymer is contaminated and that dissolves in water in a case in which the self-dispersing polymer is brought into a dispersed state. The water-soluble components are water-soluble compounds which are generated as by-products or incorporated during the production of the self-dispersing polymer.

The glass transition temperature of the self-dispersing polymer in the invention is not particularly limited. The glass transition temperature is preferably 120° C. or higher, more preferably from 120° C. to 250° C., still more preferably 150° C. to 250° C., and further preferably from 160° C. to 200° C. A glass transition temperature of 120° C. or higher improves anti-blocking properties of an image formed (especially under high-temperature high-humidity conditions). A glass transition temperature of 250° C. or lower improves rubbing resistance of the image.

The glass transition temperature of the self-dispersing polymer can be controlled, as appropriate, employing a usually-employed method. The glass transition temperature of the self-dispersing polymer can be controlled to be within a desired range by, for example, appropriately selecting the types of polymerizable groups of monomers constituting the self-dispersing polymer, the types of substituents on the monomers, the constitution ratio between the monomers, the molecular weight of the polymer molecule and the like.

The glass transition temperature (Tg) of the self-dispersing polymer in the invention is a measured Tg obtained by actual measurement. Specifically, the measured Tg means a value obtained by a measurement using a differential scanning calorimeter (DSC) EXSTAR6220 manufactured by SII Nano Technology Inc. under ordinary measurement conditions.

The self-dispersing polymer in the invention includes at least one type of hydrophilic structural unit derived from a hydrophilic monomer, and at least one type of hydrophobic structural unit derived from a hydrophobic monomer. The main chain backbone of the self-dispersing polymer is not particularly limited, and is preferably a vinyl polymer, more preferably a (meth)acrylic polymer, from the viewpoint of dispersion stability of the polymer particles. Here, the (meth)acrylic polymer refers to a polymer containing at least one of a structural unit derived from methacrylic acid or a methacrylic acid derivative or a structural unit derived from acrylic acid or an acrylic acid derivative.

(Hydrophilic Structural Unit)

The hydrophilic structural unit in the invention may be, without particular limitation, any hydrophilic structural unit that is derived from a monomer containing a hydrophilic group (hydrophilic monomer). The self-dispersing polymer in the invention may include only one type of structural unit derived from a hydrophilic-group-containing monomer, or may include two or more types of structural unit each of which is derived from a hydrophilic-group-containing monomer. The hydrophilic group is not particularly limited, and may be a dissociative group or a nonionic hydrophilic group.

In the invention, the hydrophilic groups preferably include at least one type of dissociative group, more preferably an anionic dissociative group, from the viewpoints of enhancing self-dispersibility and providing stability of the emulsification or dispersion state formed. The anionic dissociative group may be a carboxyl group, a phosphoric acid group, a sulfonic acid group or the like. Among them, a carboxyl group is particularly preferable from the viewpoint of the fixability of the ink composition to be produced.

The hydrophilic-group-containing monomer in the invention is preferably a monomer containing a dissociative group, and more preferably a dissociative-group-containing monomer containing a dissociative group and an ethylenic unsaturated bond, from the viewpoint of self-dispersibility.

The dissociative-group-containing monomer may be, for example, an unsaturated carboxylic acid monomer, an unsaturated sulfonic acid monomer, an unsaturated phosphoric acid monomer, or the like.

Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate. Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and at least one of acrylic acid or methacrylic acid is more preferable, from the viewpoints of dispersion stability and ejection stability.

Examples of the monomer having a nonionic hydrophilic group include ethylenic unsaturated monomers containing a (poly)ethyleneoxy group or a polypropyleneoxy group such as 2-methoxyethyl acrylate, 2-(2-methoxyethoxy)ethyl acrylate, 2-(2-methoxyethoxy)ethyl methacrylate, ethoxytriethyleneglycol methacrylate, methoxypolyethyleneglycol (molecular weight: from 200 to 1000) monomethacrylate and polyethyleneglycol (molecular weight: from 200 to 1000) monomethacrylate; and ethylenic unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate and hydroxyhexyl (meth)acrylate.

As the monomer having a nonionic hydrophilic group, an ethylenic unsaturated monomer of which a terminal has an alkyl ether is preferable to an ethylenic unsaturated monomer of which a terminal has a hydroxyl group, from the viewpoints of the stability of the particles and the content of water-soluble components.

It is preferable that the hydrophilic structural units of the self-dispersing polymer in the invention include only hydrophilic structural units each having an anionic dissociative group, or include hydrophilic structural units each having an anionic dissociative group as well as hydrophilic structural units each having a nonionic hydrophilic group.

It is also preferable that the hydrophilic structural units of the self-dispersing polymer include two or more types of hydrophilic unit having an anionic dissociative group, or include hydrophilic structural units each having an anionic dissociative group in combination with two or more types of hydrophilic structural unit having a nonionic hydrophilic group.

From the viewpoints of viscosity and stability over time, the content of hydrophilic structural units in the self-dispersing polymer is preferably 25% by mass or less, more preferably from 1 to 25% by mass, still more preferably from 2 to 23% by mass, and particularly preferably from 4 to 20% by mass, relative to the entire mass of the self-dispersing polymer.

When there are two or more types of hydrophilic structural unit, the total content of the hydrophilic structural units is preferably within the above range.

The content of hydrophilic structural units having an anionic dissociative group in the self-dispersing polymer is preferably within a range in which the acid value falls within the below-described preferable range.

From the viewpoint of ejection stability and stability over time, the content of structural units having a nonionic hydrophilic group is preferably from 0 to 25% by mass, more preferably from 0 to 20% by mass, and particularly preferably from 0 to 15% by mass, relative to the entire mass of the self-dispersing polymer.

In a case in which the self-dispersing polymer in the invention has an anionic dissociative group, the acid value of the self-dispersing polymer (KOHmg/g) is preferably from 20 to 200, more preferably from 22 to 120, and still more preferably from 25 to 100, from the viewpoints of self-dispersibility, the content of water-soluble components and fixability of the ink composition produced. The acid value is particularly preferably from 30 to 80. An acid value of 20 or more allows the particles to be more stably dispersed, and an acid value of 200 or less allows the amount of water-soluble components to be decreased.

(Hydrophobic Structural Unit)

The hydrophobic structural unit in the invention may be, without particular limitation, any hydrophobic structural unit that is derived form a hydrophobic-group-containing monomer (hydrophobic monomer). The hydrophobic structural units of the self-dispersing polymer may be derived from only one type of hydrophobic-group-containing monomer, or two or more types of hydrophobic-group-containing monomer. The hydrophobic group is not particularly limited, and may be any of a chain aliphatic group, a cyclic aliphatic group or an aromatic group.

In the invention, from the viewpoints of anti-blocking properties, rubbing resistance and dispersion stability, the hydrophobic monomers of the self-dispersing polymer preferably include at least one type of cyclic-aliphatic-group-containing monomer, more preferably a (meth)acrylate containing a cyclic aliphatic group (hereinafter sometimes referred to as "alicyclic (meth)acrylate").

—Alicyclic (Meth)acrylate—

In the invention, "alicyclic (meth)acrylate" means methacrylate or acrylate having a alicyclic hydrocarbon group. More specifically, the alicyclic (meth)acrylate includes a structural moiety derived from (meth)acrylic acid and a structural moiety derived from an alcohol, and has a structure including at least one unsubstituted or substituted cyclic hydrocarbon group (cyclic aliphatic group) in the alcohol-derived structural moiety. The alicyclic hydrocarbon group may correspond to the entire alcohol-derived structural moiety, or may be connected to a structural moiety derived from the hydroxyl group of the alcohol (hydroxyl-group-derived structural moiety) via a connecting group.

The alicyclic hydrocarbon group may be, without particular limitation, any alicyclic hydrocarbon group that contains a cyclic non-aromatic hydrocarbon group, and examples thereof include a monocyclic hydrocarbon group, a bicyclic hydrocarbon group and a polycyclic hydrocarbon group that is tri- or higher-cyclic.

Examples of the alicyclic hydrocarbon group include: a cycloalkyl group such as a cyclopentyl group or a cyclohexyl group; a cycloalkenyl group; a bicyclohexyl group; a norbornyl group; an isobornyl group; a dicyclopentanyl group; a dicyclopentenyl group; an adamantyl group; a decahydronaphthalenyl group; a perhydrofluorenyl group; a tricycle [$5.2.1.0^{2,6}$]decanyl group; and bicyclo[4.3.0]nonane.

The alicyclic hydrocarbon group may itself have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group and a cyano group.

The alicyclic hydrocarbon group may include a condensed ring.

In the alicyclic hydrocarbon group in the invention, the number of carbon atoms in the alicyclic hydrocarbon moiety is preferably from 5 to 20 from the viewpoints of viscosity and solubility.

Examples of the connecting group that connects the alicyclic hydrocarbon group and the hydroxyl-group-derived structural moiety include an alkylene group, an alkenylene group, an alkynylene group, an aryl alkylene group, an alkyleneoxy group, a mono- or oligo-ethyleneoxy group, and a mono- or oligo-propyleneoxy group, each of which has from 1 to 20 carbon atoms.

Specific examples of the alicyclic (meth)acrylate in the invention are shown below, but the invention is not limited thereto.

Examples of monocyclic (meth)acrylates include a cycloalkyl (meth)acrylate of which the cycloalkyl group has 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate or cyclodecyl (meth)acrylate.

Examples of bicyclic (meth)acrylates include isobornyl (meth)acrylate and norbornyl (meth)acrylate.

Examples of tricyclic (meth)acrylates include adamantyl (meth)acrylate, dicyclopentanyl (meth)acrylate and dicyclopentenyloxyethyl (meth)acrylate.

The alicyclic (meth)acrylate may be used singly, or in combination of two or more thereof.

The self-dispersing polymer preferably includes hydrophobic structural units derived from at least one alicyclic (meth)acrylate each selected from a bicyclic (meth)acrylate or a polycyclic (meth)acrylate that is tri- or higher-cyclic, and more preferably includes hydrophobic structural units derived from at least one of isobornyl (meth)acrylate, adamantyl (meth)acrylate or dicyclopentanyl (meth)acrylate, from the viewpoints of the dispersion stability of the self-dispersing polymer particles, fixability, and blocking resistance.

In the invention, the content ratio of alicyclic (meth)acrylate-derived structural units contained in the self-dispersing polymer particles is preferably from 20% by mass to 90% by mass, more preferably from 40% by mass to 90% by mass, and particularly preferably from 50% by mass to 80% by mass, relative to the total mass of the self-dispersing polymer particles, from the viewpoints of the stability of the self-dispersing state, stabilization of the particle shape in an aqueous medium through hydrophobic interactions between alicyclic hydrocarbon groups, and a decrease in the amount of water-soluble components by an appropriate degree of hydrophobization of the particles.

Fixability and blocking resistance are improved by adjusting the content ratio of alicyclic (meth)acrylate-derived structural units to 20% by mass or higher. The stability of the polymer particles is improved by adjusting the content ratio of alicyclic (meth)acrylate-derived structural units to 90% by mass or lower.

As necessary, the self-dispersing polymer in the invention may further include other additional structural units as hydrophobic structural units, in addition to the alicyclic (meth) acrylate-derived structural units. The monomers for forming the additional structural units are not particularly limited as long as they are copolymerizable with the alicyclic (meth) acrylate and the hydrophilic-group-containing monomer, and known monomers may be used.

Specific examples of the monomers for forming the additional structural units (hereinafter referred to as other copolymerizable monomers or additional copolymerizable monomers) include: alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate and ethylhexyl (meth)acrylate; aromatic-ring-containing (meth)acrylates such as benzyl (meth)acrylate and phenoxyethyl (meth)acrylate; styrenic compounds such as styrene, α-methylstyrene and chlorostyrene; dialkylaminoalkyl (meth)acrylates such as dimethylaminoethyl (meth)acrylate; and (meth)acrylamides such as N-hydroxyalkyl (meth)acrylamides (such as N-hydroxymethyl (meth)acrylamide, N-hydroxyethyl (meth)acrylamide and N-hydroxybutyl (meth) acrylamide) and N-alkoxyalkyl (meth)acrylamides (such as N-methoxymethyl (meth)acrylamide, N-ethoxymethyl (meth)acrylamide, N-(n-/iso)butoxymethyl (meth)acrylamide, N-methoxyethyl (meth)acrylamide, N-ethoxyethyl (meth)acrylamide and N-(n-/iso)butoxyethyl (meth)acrylamide).

In particular, the additional copolymerizable monomers preferably include at least one (meth)acrylate that contains a chain alkyl group having from 1 to 8 carbon atoms, more preferably include a (meth)acrylate that has a chain alkyl group having from 1 to 4 carbon atoms, and particularly preferably include methyl (meth)acrylate or ethyl (meth)acrylate, from the viewpoints of polymer skeleton flexibility and ease of control of the glass transition temperature (Tg) and from the viewpoint of dispersion stability of the self-dispersing polymer. Here, the chain alkyl group refers to an alkyl group having a straight chain or a branched chain.

In the invention, the additional copolymerizable monomers preferably include a (meth)acrylate that contains an aromatic group.

When the additional copolymerizable monomers include an aromatic-group-containing (meth)acrylate, the content of structural units derived from aromatic-group-containing (meth)acrylates in the self-dispersing polymer is preferably 40% by mass or lower, more preferably 30% by mass or lower, and particularly preferably 20% by mass or lower, relative to the entire weight of the self-dispersing polymer, from the viewpoint of the dispersion stability of the self-dispersing polymer particles.

Even when styrenic monomers are used as additional copolymerizable monomers, the content of structural units derived from styrenic monomers in the self-dispersing polymer is preferably 20% by mass or less, more preferably 10% by mass or less, and still more preferably 5% by mass or less, from the viewpoint of the stability of the self-dispersing polymer particles to be obtained. It is particularly preferable that a structural unit derived from a styrenic monomer is not contained in the self-dispersing polymer.

Here, the styrenic monomer encompasses styrene, substituted styrenes (such as α-methylstyrene and chlorostyrene) and styrene macromers having a polystyrene structural unit.

In the invention, the additional copolymerizable monomers may include only one monomer, or include two or more monomers in combination.

When the self-dispersing polymer includes additional structural units, the content thereof is preferably from 10 to 80% by mass, more preferably from 15 to 75% by mass, and particularly preferably from 20 to 70% by mass, relative to the entire mass of the self-dispersing polymer. When two or more monomers for forming additional structural units are used in combination, the total content thereof is preferably within the above-described range.

The self-dispersing polymer in the invention is preferably a polymer obtained by polymerizing at least three monomers including an alicyclic (meth)acrylate, another copolymerizable monomer and a hydrophilic-group-containing monomer, from the viewpoint of dispersion stability, and is more preferably a polymer obtained by polymerizing at least three monomers including an alicyclic (meth)acrylate, a (meth)acrylate that contains an alkyl group having a straight chain or branched chain having from 1 to 8 carbon atoms and a hydrophilic-group-containing monomer.

In the invention, from the viewpoint of dispersion stability, it is preferable that the self-dispersing polymer does not substantially include a structural unit having a highly-hydrophobic substituent derived from a (meth)acrylate having a linear or branched chain alkyl group having 9 or more carbon atoms, an aromatic-group-containing macromonomer or the like, and it is more preferable that the self-dispersing polymer does not include a structural unit having a highly-hydrophobic substituent derived from a (meth)acrylate having a linear or branched chain alkyl group having 9 or more carbon atoms, an aromatic-group-containing macromonomer or the like, at all.

The self-dispersing polymer in the invention may be a random copolymer in which respective types of structural unit are introduced irregularly, or a block copolymer in which respective types of structural unit are introduced regularly. When the self-dispersing polymer is a block copolymer, the block copolymer may be synthesized by introducing the respective types of structural unit thereof in any order, and a same type of constituent component may be used more than once. The self-dispersing polymer is preferably a random copolymer from the viewpoints of versatility and productivity.

The molecular weight range of the self-dispersing polymer in the invention, in terms of weight average molecular weight, is preferably from 3,000 to 200,000, and more preferably from 10,000 to 200,000, and still more preferably from 30,000 to 150,000. A weight average molecular weight of 3,000 or more effectively reduces the amount of water-soluble components. A weight average molecular weight of 200,000 or less enhances self-dispersing stability.

The weight average molecular weight can be measured with a gel permeation chromatograph (GPC).

From the viewpoint of controlling the hydrophilicity/hydrophobicity of the polymer, the self-dispersing polymer in the invention is preferably a vinyl polymer that contains at least one type of structural unit derived from an alicyclic (meth)acrylate at a total copolymerization ratio of from 20% by mass to 90% by mass, at least one type of structural unit derived from a dissociative-group-containing monomer, and at least one type of structural unit derived from a (meth) acrylate containing a chain alkyl group having from 1 to 8 carbon atoms, and that has an acid value of from 20 to 120, a total content of hydrophilic structural units of 25% by mass or lower, and a weight average molecular weight of from 3,000 to 200,000.

The self-dispersing polymer is more preferably a vinyl polymer that contains at least one type of structural unit derived from a bicyclic (meth)acrylate or a polycyclic (meth)acrylate that is tri- or higher-cyclic at a total copolymerization ratio of from 20% by mass to less than 90% by mass, at least one type of structural unit derived from a (meth)acrylate containing a chain alkyl group having from 1 to 4 carbon atoms at a total copolymerization ratio of from 10% by mass to less than 80% by mass, and at least one type of structural unit derived from a carboxyl-group-containing monomer at a total copolymerization ratio at which the acid value is adjusted to be in a range of from 25 to 100, wherein the vinyl polymer has a total content of hydrophilic structural units of 25% by mass or lower and a weight average molecular weight of from 10,000 to 200,000.

The self-dispersing polymer is particularly preferably a vinyl polymer that contains at least one type of structural unit derived from a bicyclic (meth)acrylate or a polycyclic (meth)acrylate that is tri- or higher-cyclic at a total copolymerization ratio of from 40% by mass to less than 80% by mass, at least one type of structural unit derived from methyl (meth)acrylate or ethyl (meth)acrylate at a total copolymerization ratio of from 20% by mass to less than 60% by mass, and at least one type of structural unit derived from acrylic acid or methacrylic acid at a total copolymerization ratio at which the acid value is adjusted to be in a range of from 30 to 80, wherein the vinyl polymer has a total content of hydrophilic structural units of 25% by mass or lower and a weight average molecular weight of from 30,000 to 150,000.

Exemplary compounds are shown below, which are specific examples of the self-dispersing polymer. However, the invention is not limited thereto. The numbers in the parentheses indicate mass ratios of copolymerization components.

methyl methacrylate/isobornyl methacrylate/methacrylic acid copolymer (20/72/8), glass transition temperature: 180° C.

methyl methacrylate/isobornyl methacrylate/methacrylic acid copolymer (40/52/8), glass transition temperature: 160° C.

methyl methacrylate/isobornyl methacrylate/methacrylic acid copolymer (50/44/6), glass transition temperature: 140° C.

methyl methacrylate/isobornyl methacrylate/methacrylic acid copolymer (85/7/8), glass transition temperature: 120° C.

methyl methacrylate/benzyl methacrylate/methacrylic acid copolymer (85/7/8), glass transition temperature: 100° C.

methyl methacrylate/dicyclopentanyl methacrylate/methacrylic acid copolymer (20/72/8), glass transition temperature: 160° C.

methyl methacrylate/isobornyl methacrylate/dicyclopentanyl methacrylate/methacrylic acid copolymer (20/62/10/8), glass transition temperature: 170° C.

The method of producing a self-dispersing polymer in the invention is not particularly limited, and the self-dispersing polymer can be produced by copolymerizing a monomer mixture according to a known polymerization method. Among polymerization methods, polymerization in an organic solvent is preferable, and a solution polymerization method is particularly preferable, from the viewpoint of droplet ejection stability of the ink composition to be obtained.

In the method of producing a self-dispersing polymer according to the invention, the water-insoluble polymer can be produced by allowing a mixture that contains a monomer mixture and optionally contains an organic solvent and a radical polymerization initiator to undergo a copolymerization reaction under an inactive gas atmosphere.

The method of producing an aqueous dispersion of self-dispersing polymer particles in the invention is not particularly limited, and an aqueous dispersion of self-dispersing polymer particles can be produced according to a known method. The process of obtaining the self-dispersing polymer in the form of an aqueous dispersion is preferably a phase inversion emulsification method including the following processes (1) and (2):

Process (1): a process of agitating a mixture containing a water-insoluble polymer, an organic solvent, a neutralization agent and an aqueous medium to obtain a dispersion Process (2): a process of removing at least a part of the organic solvent from the dispersion The process (1) is preferably treatment in which the water-insoluble polymer is dissolved in the organic solvent, and then the neutralization agent and the aqueous medium are gradually added thereto and mixed to form a dispersion. When a neutralization agent and an aqueous medium are added to a water-insoluble polymer solution in which a water-insoluble polymer is dissolved in an organic solvent as in the above process, self-dispersing polymer particles of which the diameter is highly stable during storage can be obtained without requiring a strong shearing force.

The method of agitating the mixture is not particularly limited, and a generally-used mixing and stirring apparatus and, optionally, a disperser such as an ultrasonic disperser or a high-pressure homogenizer, may be used, as necessary.

Preferable examples of the organic solvent include alcohol solvents, ketone solvents and ether solvents.

Examples of alcohol solvents include isopropyl alcohol, n-butanol, t-butanol and ethanol. Examples of ketone solvents include acetone, methyl ethyl ketone, diethyl ketone and methyl isobutyl ketone. Examples of ether solvents include dibutyl ether and dioxane. Among the above solvents, ketone solvents such as methyl ethyl ketone and alcohol solvents such as isopropyl alcohol are preferable.

It is also preferable to use isopropyl alcohol and methyl ethyl ketone in combination. Combined use of the solvents makes it possible to obtain self-dispersing polymer particles having a very small particle diameter that are free from aggregation precipitation or adhesion between the particles and that have high dispersion stability. This is thought to be caused by milder polarity change at the time of phase inversion from the oil phase to the aqueous phase The neutralization agent is used to neutralize all or some of the dissociative groups of the polymer so as to allow the self-dispersing polymer to get into a stable emulsion or dispersion state in water. When the self-dispersing polymer has an anionic dissociative group as a dissociative group, the neutralization agent to be used may be a basic compound such as an organic amine compound, ammonia or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine and triisopropanolamine. Examples of the alkali metal hydroxide include lithium hydroxide, sodium hydroxide and potassium hydroxide. Among them, sodium hydroxide, potassium hydroxide, triethylamine and triethanolamine are preferable from the viewpoint of stabilization of the dispersion of the self-dispersing polymer particles according to the invention in water.

The amount of basic compound to be used is preferably from 5 to 120% by mol, more preferably from 20 to 100% by mol, and still more preferably from 30 to 80% by mol, relative to 100% by mol of the dissociative group. When the amount of basic compound is 5% by mol or more, an effect of stabilizing the dispersion of the particles in water can be exerted. When the amount of basic compound is 120% by mol or less, an effect of reducing water-soluble components can be exerted.

In the process (2), the organic solvent is removed from the dispersion obtained through the process (1), by a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the residual organic solvent is preferably 0.2% by mass or less, and more preferably 0.1% by mass or less.

The average particle diameter of the resin particles in the invention is preferably in the range of from 1 to 100 nm, more preferably from 3 to 80 nm, still more preferably from 5 nm to 60 nm, and particularly preferably from 5 nm to 40 nm. When the average particle diameter is 1 nm or more, suitability for production is improved. When the average particle diameter is 100 nm or less, storage stability is improved.

The particle diameter distribution of the resin particles is not particularly limited, and may be a broad particle diameter distribution or a monodisperse particle diameter distribution. It is possible to use a mixture of two or more types of water-insoluble particle.

The average particle diameter and particle diameter distribution of the resin particles can be determined by, for example, using a light scattering method.

In the ink composition according to the invention, it is preferable that the resin particles are present in a form that is substantially free of a coloring agent.

The resin particles in the invention have excellent self-dispersibility, and the stability thereof when the polymer is dispersed alone is quite high. However, the resin particles are not highly effective with respect to the function of stably dispersing a pigment, i.e. the function as a dispersant. Therefore, in a case in which the self-dispersing polymer in the invention is present in an ink composition in such a manner that the self-dispersing polymer contains a pigment, as a consequence, the stability of the ink composition as a whole is largely reduced in some cases.

The inkjet ink composition according to the invention may contain only a single type of resin particle, or two or more types of resin particle.

The content of resin particles in the ink composition according to the invention is preferably from 1 to 30% by mass, more preferably from 2 to 20% by mass, and particularly preferably from 2 to 10% by mass, relative to the inkjet ink composition, from the viewpoints of image gloss and the like.

The mass ratio of colorant to resin particles (colorant/resin particles) in the inkjet ink composition according to the invention is preferably from 1/0.5 to 1/10, and more preferably from 1/1 to 1/4, from the viewpoints of rubbing resistance of the image and the like.

The combination of the content of urea and the content of resin particles is not particularly limited, and the following combinations are preferable from the viewpoint of effectively achieving the balance between the wipe-off properties and image fixability.

That is, a combination of a urea content of 1.0% by mass or higher and a resin particle content of 5% by mass or higher is preferable, a combination of a urea content of from 1.0% by mass to 20% by mass and a resin particle content of from 5% by mass to 20% by mass is more preferable, and a combination of a urea content of from 3.0% by mass to 10% by mass and a resin particle content of from 5% by mass to 10% by mass is particularly preferable.

The ratio of the urea content to the total solids content (the total sum of the contents of the water-insoluble resin, the pigment and the resin particles) (the mass of urea/the total mass of the solids) in the ink composition is preferably 0.3 or higher, more preferably from 0.4 to 2.0, and most preferably from 0.5 to 1.5.

(Other Additives)

The inkjet ink composition according to the invention may include other additives as necessary, in addition to the above components.

Examples of other additives in the invention include known additives such as anti-fading agents, emulsion stabilizers, penetration promoters, ultraviolet absorbers, preservatives, antifungal agents, pH adjusters, surface tension adjusters, defoaming agents, viscosity adjustment agents, dispersants, dispersion stabilizers, antirust agents, and chelating agents. These various additives may be directly added after the preparation of the inkjet ink composition, or may be added during the preparation of the inkjet ink composition. Specific examples of other additives include other additives described in paragraphs [0153] to [0162] of JP-A No. 2007-100071.

Examples of surface tension adjusters include nonionic surfactants, cationic surfactants, anionic surfactants and betaine surfactants.

The addition amount of surface tension adjuster is preferably an addition amount that adjust the surface tension of the ink composition to be from 20 to 60 mN/m, more preferably from 20 to 45 mN/m, and still more preferably from 25 mN/m to 40 mN/m, in order to achieve favorable droplet ejection by an inkjet method.

The surface tension of the ink composition can be measured at 25° C. using, for example, a plate method.

In regard to specific examples of surfactants, preferable hydrocarbon surfactants include: anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters and oxyethylene oxypropylene block copolymers. Further, SURFYNOLS (manufactured by Air Products and Chemicals, Inc.) and OLFINEs (manufactured by Nisshin Chemical Industry Co., Ltd.), which are acetylene polyoxyethyleneoxide surfactants, are preferably used. Moreover, amine oxide amphoteric surfactants such as N,N-dimethyl-N-alkylamine oxide and the like are also preferable.

Further, surfactants described in pages 37 to 38 of JP-A No. 59-157636, and Research Disclosure No. 308119 (1989) are also usable.

Use of fluorine (fluorinated alkyl) surfactants or silicone surfactants, such as those described in JP-A Nos. 2003-322926, 2004-325707 and 2004-309806, improves rubbing resistance.

These surface tension adjusters can be used also as defoaming agents, and fluorine-based compounds, silicone-based compounds, chelating agents such as EDTA and the like are also usable.

When an ink is applied by an inkjet method, from the viewpoint of ink ejection stability and coagulation speed, the viscosity of the ink composition according to the invention is preferably in the range of from 1 to 30 mPa·s, more preferably in the range of from 1 to 20 mPa·s, still more preferably in the range of from 2 to 15 mPa·s, and particularly preferably in the range of from 2 to 10 mPa·s.

The viscosity of the ink composition can be measured at 20° C. using, for example, a Brookfield viscometer.

The pH of the ink composition according to the invention is preferably from pH7.5 to pH10, and more preferably from pH8 to pH9, from the viewpoints of ink stability and coagulation speed. The pH of the ink composition is measured at 25° C. using a usually-employed pH measurement instrument (such as a multi-parameter water quality meter MM-60R manufactured by DKK-TOA CORPORATION).

The pH of the ink composition can be adjusted, as appropriate, using an acidic compound or a basic compound. Usually-employed compounds can be used as the acidic compound or the basic compound, without particular limitations.

Ink Set

An ink set according to the invention includes at least one of the inkjet ink composition described above, and at least one treatment liquid capable of forming an aggregate when contacting the inkjet ink composition.

The ink set according to the invention is used in an image forming method using the inkjet ink composition described above, and is preferable particularly as an ink set used in the image forming method described below.

The ink set according to the invention can be used in the form of an ink cartridge that integrally accommodates the ink(s) and treatment liquid(s) or ink cartridges that independently accommodate the ink(s) and treatment liquid(s). The use of the ink cartridge is preferable also from the viewpoint of convenience in handling and the like. Ink cartridges configured to contain an ink set are known in the relevant technical field, and ink cartridge can be prepared by appropriately using known methods.

Treatment Liquid

The treatment liquid in the invention is an aqueous composition that is capable of forming an aggregate when contacting the inkjet ink composition. Specifically, the treatment liquid may be configured to include at least an aggregation component capable of forming an aggregate upon mixing with the ink composition by aggregating dispersed particles such as a resin-coated pigment in the ink composition, and optionally include other components as necessary. Use of the treatment liquid together with the ink composition enables inkjet recording at higher speed, and enables a high-density and high-resolution image to be obtained even when high-speed recording is performed.

Aggregation Component

The treatment liquid includes at least one aggregation component capable of forming an aggregate when contacting the ink composition. Due to the treatment liquid mixing with the ink composition ejected by an inkjet method, the aggregation of resin-coated pigment and the like which have been stably dispersed in the ink composition is promoted.

Examples of the treatment liquid include a liquid composition capable of forming an aggregate by changing the pH of the ink composition. Here, the pH (25 C.°) of the treatment liquid is preferably from 1 to 6, more preferably from 1.2 to 5, and still more preferably from 1.5 to 4, from the viewpoint of the coagulation speed of the ink composition. In this case, the pH (25° C.) of the ink composition used in the ejection process is preferably from 7.5 to 9.5 (more preferably from 8.0 to 9.0).

In particular, in the invention, it is preferable that the ink composition has a pH) (25 C.° of 7.5 or more and the treatment liquid has a pH (25 C.°) of from 3 to 5, from the viewpoints of image density, resolution and an increase in inkjet recording speed.

The aggregation component may be used singly, or in mixture of two or more thereof.

The treatment liquid may be configured to include at least one acidic compound as an aggregation component. Examples of the acidic compound include a compound having a phosphoric acid group, a phosphonic acid group, a phosphinic acid group, a sulfuric acid group, a sulfonic acid group, a sulfinic acid group or a carboxyl group, or a salt thereof (for example, a polyvalent metal salt). Among them, a compound having a phosphoric acid group or a carboxyl group is preferable, and a compound having a carboxyl group is more preferable, from the viewpoint of the coagulation speed of the ink composition.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative of any of these compounds or a salt (such as a polyvalent metal salt) of any of these compounds. These compounds may be used singly, or in combination of two or more thereof.

The treatment liquid in the invention may further include an aqueous solvent (such as water) in addition to the acidic compound.

The content of acidic compound in the treatment liquid is preferably from 5 to 95% by mass, and more preferably from 10 to 80% by mass, relative to the total mass of the treatment liquid, from the viewpoint of coagulation effect.

A preferable example of the treatment liquid that improves high-speed coagulation properties may be a treatment liquid that contains a polyvalent metal salt or polyallylamine. Examples of the polyvalent metal salt include salts of alkali earth metals (such as magnesium and calcium) belonging to Group 2 of the Periodic Table, salts of transition metals (such as lanthanum) belonging to Group 3 of the Periodic Table, salts of metals (such as aluminum) of Group 13 of the Periodic Table, and salts of lanthanides (such as neodymium). Further examples of aggregation components include polyallylamine and polyallylamine derivatives. Carboxylic acid salts (such as formic acid salts, acetic acid salts and benzoic acid salts), nitric acid salts, chloride salts and thiocyanic acid salts are suitable as metal salts. In particular, a calcium or magnesium salt of a carboxylic acid (such as formic acid, acetic acid or benzoic acid), a calcium or magnesium salt of nitric acid, calcium chloride, magnesium chloride, and a calcium or magnesium salt of thiocyanic acid, are preferable.

The content of metal salt in the treatment liquid is preferably from 1 to 10% by mass, more preferably from 1.5 to 7% by mass, and still more preferably from 2 to 6% by mass.

The viscosity of the treatment liquid is preferably in the range of from 1 to 30 mPa·s, more preferably in the range of from 1 to 20 mPa·s, still more preferably from 2 to 15 mPa·s, and particularly preferably from 2 to 10 mPa·s, from the viewpoint of the coagulation speed of the ink composition. The viscosity is measured under a condition of 20° C. using a VISCOMETER TV-22 (manufactured by TOKI SANGYO CO., LTD).

The surface tension of the treatment liquid is preferably from 20 to 60 mN/m, more preferably from 20 to 45 mN/m, and still more preferably from 25 to 40 mN/m, from the viewpoint of the coagulation of the ink composition. The surface tension is measured under a condition of 25° C. using an Automatic Surface Tensiometer CBVP-Z (manufactured by Kyowa Interface Science Co., Ltd.).

Inkjet Image Forming Method

The inkjet image forming method according to the invention includes: an ink ejection process of ejecting the inkjet ink composition from an inkjet head equipped with a silicone nozzle plate onto a recording medium to form an image, and optionally includes other processes as necessary.

In the invention, the inkjet image forming method preferably further include sa treatment liquid application process of applying a treatment liquid, which is capable of forming an aggregate when contacting the inkjet ink composition, onto the recording medium.

—Ink Ejection Process—

In the ink ejection process, the above-described inkjet ink composition according to the invention is applied, by inkjet, onto a recording medium from an inkjet head equipped with a silicone nozzle plate. In this process, the ink composition can be applied selectively onto a recording medium, whereby a desired visual image can be formed. The specifics of the ink composition of according to invention, such as the specifics of the components and preferable embodiments, are as described above.

Specifically, image formation employing an inkjet method may be performed by ejecting, by applying energy, a liquid composition onto a desired recording medium such as: plain paper, resin-coated paper such as paper exclusively for inkjet recording described in JP-A Nos. 8-169172, 8-27693, 2-276670, 7-276789, 9-323475, 62-238783, 10-153989, 10-217473, 10-235995, 10-337947, 10-217597, and the like; films; paper that can be used both for inkjet recording and electrophotographic recording; cloth; glass; metals; and ceramics. The method described in paragraphs [0093] to [0105] of JP-A No. 2003-306623 can be applied as an inkjet recording method preferred in the invention.

The inkjet method is not particularly limited, and may be any known method such as a charge-control method in which ink is ejected by electrostatic attraction force, a drop-on-demand method (pressure-pulse method) in which a pressure of oscillation of a piezo element is utilized, an acoustic inkjet method in which ink is ejected by radiation pressure generated by irradiation of ink with acoustic beams that have been converted from electric signals, and a thermal inkjet method in which ink is ejected by a pressure generated by formation of bubbles caused by heating of ink (BUBBLEJET, registered trademark).

Further, the scope of the inkjet method includes a method in which a large number of small-volume droplets of an ink having a low optical density, which is called a photo ink, are ejected; a method in which plural inks having substantially the same hue but at different densities are used to improve image quality; and a method in which a clear and colorless ink is used.

The inkjet head used in an inkjet method may be either an on-demand type head or a continuous type head. Specific examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system). Any of these ejection systems may be employed.

The ink nozzles and the like used for recording by the inkjet method are not particularly limited, and may be selected, as appropriate, in accordance with the purpose.

Regarding the inkjet method, there are a shuttle system in which recording is performed while a short serial head having a small length is moved in the width direction of a recording medium in a scanning manner, and a line system in which a line head having recording devices that are aligned to correspond to the entire length of one side of a recording medium is used. In the line system, image recording can be performed over the whole of one surface of a recording medium by moving the recording medium in a scanning manner in a direction orthogonal to the alignment direction of the recording devices, and a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system. The inkjet image forming method of the invention can be applied to both of these systems; effects in improving the ejection accuracy and rubbing resistance of an image are larger when the inkjet image forming method of the invention is applied to a line system, in which dummy ejection is generally not performed.

When the line system is applied in the ink ejection process in the invention, favorable recording can be performed not only in the case of using one type of ink composition, but also in the case of using two or more types of ink composition in such a manner that the interval between the ejection (ink spotting) of one ink composition (nth color ($n \geq 1$), for example the second color), and the ejection (ink spotting) of the next ink composition (($n+1$)th color, for example the third color) is 1 second or less. In the invention, when the interval between each ejection in the line system recording is set to 1 second or less, an image which has excellent rubbing resistance and in which occurrence of blocking is suppressed can be obtained by recording at higher speeds than before, while preventing bleed and intermingling of colors caused by interference between ink droplets. Further, an image having excellent hue and excellent printing properties (such as reproducibility of thin lines and fine portions in the image) can be obtained.

The liquid droplet volume of the ink ejected from the inkjet head is preferably from 0.5 to 6 pl (pico-liter), more preferably from 1 to 5 pl, and still more preferably from 2 to 4 pl, from the viewpoint of obtaining a high resolution image.

Inkjet Head Having Silicon Nozzle Plate

An inkjet head used in the image forming method according to the invention is equipped with a nozzle plate of which at least a part is configured to include silicone. FIG. 1 is a cross-sectional view schematically showing an example of the internal structure of an inkjet head.

As shown in FIG. 1, an inkjet head 100 includes a nozzle plate 11 having ejection ports (nozzles), and an ink supply unit 20 provided at a side of the nozzle plate opposite to the side toward which ink is ejected. The nozzle plate 11 is provided with plural ejection ports 12, each of which ejects an ink.

Figure 2:
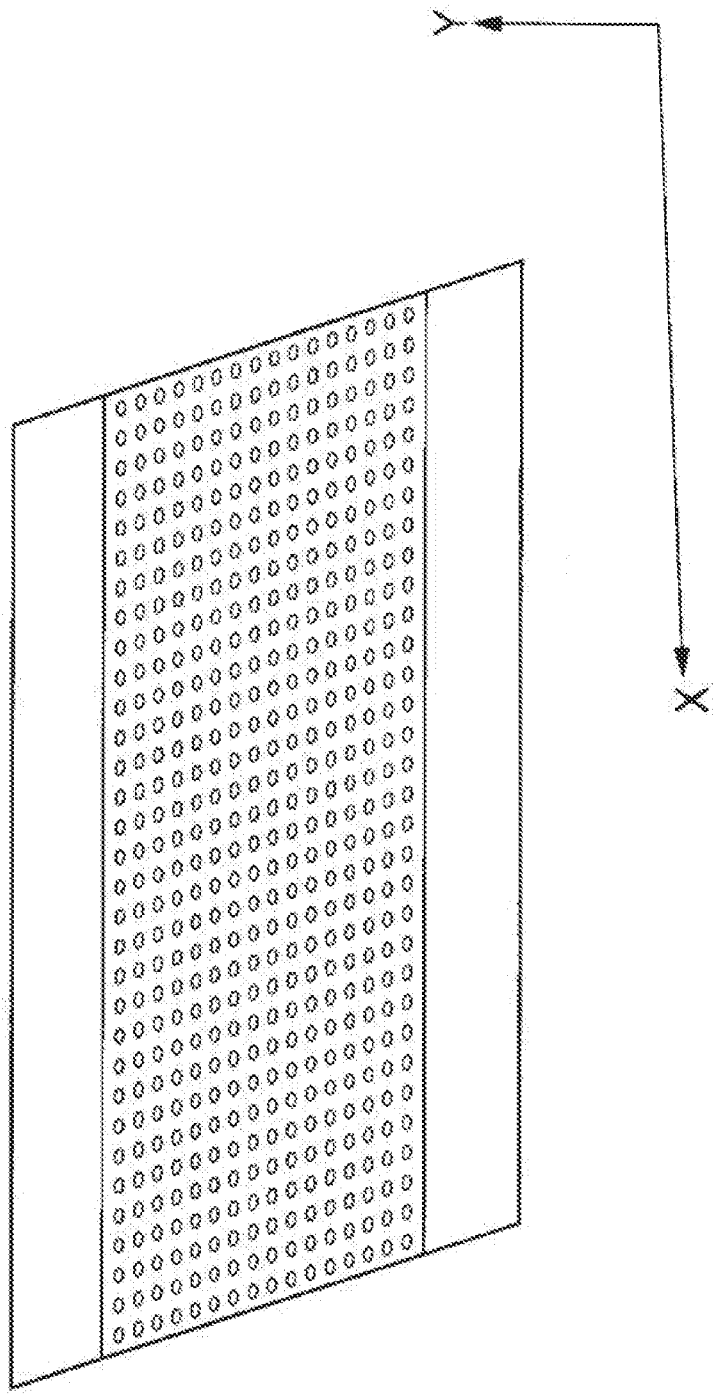
FIG. 2 is a schematic diagram illustrating an example of an ejection port arrangement of a nozzle plate.

As shown in FIG. 2, the nozzle plate 11 has 32×60 ejection ports (nozzles) that are two-dimensionally arranged. At least a part of each nozzle plate is formed from silicone, and the nozzle plate has a structure in which the silicone is exposed at the inner wall of the nozzle and the plate face at the ink ejection side. Although not shown in the drawing, a liquid-repellent film is provided on at least a part of the plate face of each nozzle plate 11 at the ink ejection side. In FIG. 2, direction Y represents a direction in which a recording medium is conveyed (subscanning direction), and direction X represents the longer side of the line head (main scanning direction).

The ink supply unit 20 includes: plural pressure chambers 21 that respectively communicate with the plural ejection ports 12 of the nozzle plate 11 via nozzle communication paths 22; plural ink supply paths 23 through which an ink is supplied to the plural pressure chambers 21; a common liquid reservoir 25 from which an ink is supplied to the plural ink supply paths 23; and a pressure-generating unit 30 that individually deforms the plural pressure chambers 21.

The Ink supply paths 23 are formed between the nozzle plate 11 and the pressure-generating unit 30, and an ink that has been supplied to the common liquid reservoir 25 is delivered to the ink supply paths 23. Each ink supply paths 23 is connected to one end of a supply adjustment path 24 that connects the ink supply path 23 with the pressure chamber 21, whereby the amount of ink supplied from the ink supply path 23 can be controlled to be a required amount and supplied to the pressure chamber 21. Two or more of the supply adjustment path 24 are provided at the ink supply paths 23, and an ink is supplied to the pressure chamber 21 positioned adjacent to the pressure-generating unit 30, through the ink supply passages 23.

In this way, a large amount of ink can be supplied to plural ejection ports.

The pressure-generating unit 30 includes a vibrating plate 31, an adhesion layer 32, a lower electrode 33, a piezoelectric material layer 34 and an upper electrode 35, which are disposed one on another in this order from the pressure chamber 21 side, and an electrical wiring that supplies driving signals from the outside is connected to the pressure-generating unit 30. The piezoelectric element deforms according to the image signal, as a result of which an ink is ejected from nozzles 12 via nozzle communication paths 22.

Circulation apertures 41 are provided around ejection ports 12, and the ink is constantly recovered into circulation paths 42. In this way, an increase in the viscosity of the ink in the vicinity of the ejection ports when the ink is not ejected can be prevented.

—Treatment Liquid Application Process—

In the treatment liquid application process, a treatment liquid capable of forming an aggregate when contacting the ink composition is applied to a recording medium, thereby contacting the treatment liquid with the ink composition to form an image. In this process, dispersed particles, such as polymer particles and a resin-coated pigment, in the ink composition aggregate, as a result of which an image is fixed onto the recording medium. The specifics and preferable embodiments of the components of the treatment liquid are as described above.

The application of the treatment liquid can be performed employing a known method such as a coating method, an inkjet method, or a dipping method. The coating method may be a known coating method using a bar coater, an extrusion die coater, an air doctor coater, a blade coater, a rod coater, a knife coater, a squeeze coater, a reverse roll coater, or the like. The specifics of the inkjet method are as described above.

The treatment liquid application process may be conducted either before or after the ink ejection process using the ink composition.

In the invention, an embodiment in which the ink ejection process is conducted after the treatment liquid is applied in the treatment liquid application process is preferable. That is, an embodiment in which the treatment liquid for aggregating a pigment in the ink composition is applied onto a recording medium in advance of the application of the ink composition, and then the ink composition is applied so as to contact the treatment liquid that has been applied onto the recording medium, thereby forming an image, is preferable. This embodiment allows inkjet recording to be carried out at higher speeds, and an image having high density and high resolution can be obtained even when high-speed recording is performed.

The amount of the treatment liquid to be applied is not particularly limited as long as the treatment liquid is capable of coagulating the ink composition. The amount of the treatment liquid to be applied is preferably an amount such that the amount of aggregation components (such as a di- or higher-valent carboxylic acid or a cationic organic compound) applied is 0.1 g/m$^2$ or larger. In particular, the amount of the treatment liquid to be applied is more preferably an amount such that the amount of aggregation component applied is from 0.1 to 1.0 g/m$^2$, and more preferably from 0.2 to 0.8 g/m$^2$. When the amount of aggregation components applied is 0.1 g/m$^2$ or more, the aggregation reaction proceeds favorably. When the amount of aggregation components applied is 1.0 g/m$^2$ or less, gloss is not excessively high, and thus the amount is preferable.

In the invention, it is preferable that the ink ejection process is conducted after the treatment liquid application process, and that a heat-drying process of drying the treatment liquid on the recording medium by heating is further conducted during a period from after the application of the treatment liquid onto the recording medium to the application of the ink composition. Drying of the treatment liquid by heating performed in advance of the ink ejection process realizes favorable ink spotting properties such as bleed prevention, and realizes recording of a visible image having excellent color density and excellent hue.

The drying by heating may be conducted by using a known heating means such as a heater, a blowing means utilizing air blow such as a dryer, or a combination thereof. The heating may be performed according to, for example, a method of applying heat, by using a heater or the like, from a side of the recording medium opposite to the face applied with the treatment liquid, a method of blowing warm or hot air to the face of the recording medium applied with the treatment liquid, or a method of heating by using an infrared heater. Alternatively, two or more of these methods may be combined and used for the heating.

Thermal Fixing Process

The inkjet image forming method according to the invention preferably includes, after the ink ejection process, a thermal fixing process of thermally fixing an ink image formed by the application of the ink composition by bringing the ink image into contact with a heating surface. The image on the recording medium is fixed through the thermal fixing process, and thus the rubbing resistance of the image can be further improved.

The method of heating is not particularly limited, and preferable examples thereof include a noncontact drying method, such as a method of heating with a heat generator such as a NICHROME wire heater, a method of supplying warm or hot air, or a method of heating with a halogen lamp, an infrared lamp, or the like. The method of applying heat and pressure is not particularly limited, and preferable examples thereof include a contact thermal fixing method, such as a method of pressing a hot plate against an image-formed surface of the recording medium, a method in which a heat-pressurization apparatus is used to pass the recording medium through a pressure contact portion, wherein the heat-pressurization apparatus may have a pair of heat-pressurization rollers or a pair of heat-pressurization belts, or may have a heat-pressurization belt disposed at the image-recorded surface side of the recording medium and a support roller disposed at the opposite side of the recording medium. The pressure contact portion is thus formed between the pair of rollers or between the pair of heat-pressurization belts or between the heat-pressurization belt and the support roller.

The conveyance speed of the recording medium when using a heat-pressurization roller or a heat-pressurization belt is preferably in the range of from 200 to 700 mm/sec, more preferably from 300 to 650 mm/sec, and still more preferably from 400 to 600 mm/sec.

Maintenance Process

The inkjet image forming method according to the invention may further include a maintenance process of removing the ink composition or a solid adhered matter derived from the ink composition from the nozzle face of the inkjet head.

Due to the use of the above-described specific ink composition in the image forming method according to the invention, the ink solid adhered matter derived from the ink composition on the nozzle face can be easily removed.

In the maintenance process, the ink composition or the solid adhered matter derived from the ink composition is removed by scraping off with a wiper blade or wiping off with cloth or paper.

The maintenance process may include applying a maintenance liquid to a portion at or around the inkjet head (for example, ink flow paths; hereinafter referred to as head and the like). As a result of the application of the maintenance liquid to the head and the like, the ink solid adhered matter derived from the ink on the nozzle faced undergoes dissolution, swelling or the like, and becomes more easily removable.

The application of the maintenance liquid may be carried out either before or after the scraping off with a wiper blade or wiping off with cloth or paper. Preferable methods include a method of scraping the nozzle face with a wiper blade (wiping) after application of a maintenance liquid so as to scrape off the ink solid adhered matter, a method of removing by wind pressure, liquid pressure of the maintenance liquid or the like, or the like, and a method of wiping off with cloth or paper. In particular, scraping off with a wiper blade or wiping off with cloth or paper is preferable.

The material of the wiper blade is preferably a rubber having elasticity, and specific examples of the material include butyl rubber, chloroprene rubber, ethylenepropylene rubber, silicone rubber, urethane rubber and nitrile rubber. It is also possible to use a wiper blade that has been coated with a fluororesin or the like in order to impart ink repellency to the wiper blade.

—Recording Medium—

According to the inkjet image forming method of the invention, an image is recorded on a recording medium.

The recording medium is not particularly limited, and may be a cellulose-based general printing paper, such as so-called high-quality paper, coat paper, or art paper, that is used for general offset printing and the like. When image recording is performed on the cellulose-based general printing paper by a general inkjet method using an aqueous ink, absorption and drying of the ink is relatively slow, colorant migration easily occurs after ink spotting, and image quality tends to lower. In contrast, according to the inkjet image forming method of the invention, a high-quality image having excellent color density and excellent hue can be recorded while suppressing the migration of the colorant.

Commercially-available products can be used as the recording medium, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and New NPI jo-shitsu (New NPI high-quality; tradename) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as 2/SIDE GOLDEN CASK GLOSS (tradename) manufactured by Oji Paper Co., Ltd. and TOKUBISHI ART (tradename) manufactured by Mitsubishi Paper Mills Ltd. Various inkjet-recording papers exclusively for photos are also usable.

Among them, a recording medium having a water absorption coefficient Ka of from 0.05 to 0.5 mL/m$^2$·ms$^{1/2}$ is preferable, a recording medium having a water absorption coefficient Ka of from 0.1 to 0.4 mL/m$^2$·ms$^{1/2}$ is more preferable, and a recording medium having a water absorption coefficient Ka of from 0.2 to 0.3 mL/m$^2$·ms$^{1/2}$ is still more preferable, from the viewpoints of obtaining large effects in suppression of colorant migration and obtaining a high-quality image having more favorable color density and hue than before.

The water absorption coefficient Ka has the same definition as that described in JAPAN TAPPPI Pulp and Paper Testing Method No. 51: 2000 (published by JAPAN TAPPI). Specifically, the water absorption coefficient Ka is calculated from a difference in water transfer amount between a contact time of 100 ms and a contact time of 900 ms that are measured using an automatic scanning liquid absorptometer KM500win (manufactured by KUMAGAI RIKI KOGYO CO., LTD.).

Among the recording media, so-called coated paper, which is used for general offset printing, is preferable. The coated paper is produced generally by coating a surface of cellulose-based paper (such as high-quality paper or neutral paper) that has not been subjected to surface treatment, with a coating material so as to form a coating layer. When image forming is performed by usual aqueous inkjet, the coated paper tends to produce problems in quality, for example in image gloss or rubbing resistance. However, unevenness in gloss is suppressed and an image having excellent gloss and excellent rubbing resistance can be obtained according to the inkjet image forming method according to the invention even when the coated paper is used. In particular, it is preferable to use a coated paper having base paper and a coated layer containing kaolin and/or calcium bicarbonate. More specifically, art paper, coat paper, lightweight coat paper, or very light-weight coat paper is preferable.

EXAMPLES

The present invention is described more specifically below by reference to examples. However, the invention is not limited to these examples. "Part(s)" and "%" represent "part(s) by mass" and "% by mass", respectively, unless indicated otherwise.

Weight average molecular weight is measured with a gel permeation chromatography (GPC). HLC-8020GPC manufactured by Tosoh Corporation, was used as a GPC instrument. Three columns, TSKgel Super HZM-H, TSKgel SuperHZ4000 and TSKgel SuperHZ200 (all of which are tradenames of Tosoh Corporation), which were connected in series, were used as the columns. THF (tetrahydrofuran) was used as an eluent. Regarding the conditions, the sample concentration was 0.35%, the flow rate was 0.35 ml/min, the sample injection amount was 10 μl, and the measurement temperature was 40° C. The detection was performed using an RI detector. The calibration curve was prepared from the following eight samples: standard sample TSK STANDARD POLYSTYRENE, F-40, F-20, F-4, F-1, A-5000, A-2500, A-1000, and n-propylbenzene, all of which are manufactured by Tosoh Corporation.

Synthesis Example 1

—Synthesis of Monomer (M-25/M-27) Mixture—

9.76 parts of 9(10H)-acridone and 5.61 parts of potassium t-butoxide were dissolved in 30 parts of dimethyl sulfoxide, and heated to 45° C. 15.26 parts of a mixture chloromethyl-styrene (CMS-P manufactured by SEIMI CHEMICAL CO., LTD., meta form/para form=50/50 (mol/mol) was dropwise added thereto, followed by stirring while heating at 50° C. for 5 hours. The reaction liquid was poured into 200 parts of distilled water while stirring, and the precipitate obtained was isolated by filtration and washed, as a result of which 11.9 parts of a monomer (M-25/M-27) mixture were obtained.

Synthesis Example 2

—Synthesis of Water-insoluble Resin P-1—

88 g of Methyl ethyl ketone was added into a 1000 ml three-neck flask equipped with a stirrer and a condenser tube, and heated to 72° C. under a nitrogen atmosphere. A solution of 0.85 g of dimethyl-2,2'-azobisisobutyrate, 15 g of the monomer (M-25/M-27) mixture, 10 g of methacrylic acid and 85 g of ethyl methacrylate dissolved in 50 g of methyl ethyl ketone was dropwise added thereto over 3 hours. After the dropwise addition was completed, the reaction was allowed to further proceed for 1 hour. Thereafter, a solution of 0.42 g of dimethyl 2,2'-azobisisobutyrate dissolved in 2 g of methyl ethyl ketone was added thereto, and the resultant mixture was heated to 78° C. and heated at this temperature for 4 hours. The reaction solution obtained was re-precipitated twice in an excess quantity of hexane, and the precipitated resin was dried, as a result of which 96.5 g of a copolymer of the monomer (M-25/M-27) mixture/ethyl methacrylate/methacrylic acid (copolymerization ratio (mass % ratio)=15/75/10) (water-insoluble resin P-1, hereinafter sometimes referred to as resin dispersant P-1) was obtained.

The composition of the obtained water-insoluble resin P-1 was confirmed with $^1$H-NMR. The weight average molecular weight (Mw) as determined by GPC was 49,400. Further, the acid value of the polymer as determined according to the method described in JIS Standard (JIS-K0070: 1992) was 65.2 mg KOH/g.

The amount of the water-insoluble resin P-1 that dissolved in 100 g of water at 25° C. was 5 g or less.

Synthesis Example 3

—Preparation of Self-dispersing Polymer Particles—

540.0 g of methyl ethyl ketone was placed in a 2 L three-neck flask equipped with a stirrer, a thermometer, a reflux condenser tube and nitrogen gas inlet tube, and was heated to 75° C. under a nitrogen atmosphere. A mixed solution of 216 g of methyl methacrylate (MMA), 280.8 g of isobornyl methacrylate (IBOMA), 43.2 g of methacrylic acid (MAA), 108 g of methyl ethyl ketone and 2.16 g of V-601 (manufactured by Wako Pure Chemical Industries, Ltd.) was dropwise added thereto at a constant rate while maintaining the temperature inside the reaction vessel at 75° C., such that the dropwise addition was completed in 2 hours. After the dropwise addition was completed, a solution of 1.08 g of V-601 (manufactured by Wako Pure Chemical Industries, Ltd.) and 15.0 g of methyl ethyl ketone was added thereto, and stirred at 75° C. for 2 hours. Subsequently, a solution of 0.54 g of V-601 and 15.0 g of methyl ethyl ketone was further added, and stirred at 75° C. for 2 hours. Then, the reaction solution was heated to 85° C., and stirring was further continued for 2 hours.

The weight average molecular weight (Mw) of the copolymer obtained was 63,000, and the acid value of the copolymer was 52.1 mgKOH/g.

Then, 588.2 g of the polymerization solution was weighed out, and 165 g of isopropanol and 120.8 ml of a 1 mol/L aqueous solution of NaOH were added thereto, and the temperature inside the reaction vessel was elevated to 80° C. Subsequently, 718 g of distilled water was dropwise added at a rate of 20 ml/min, thereby forming an aqueous dispersion. Thereafter, under atmospheric pressure, the temperature inside the reaction vessel was sequentially maintained at 80° C. for 2 hours, 85° C. for 2 hours and 90° C. for 2 hours, thereby removing the solvent. Further, the pressure inside the reaction vessel was reduced to remove the isopropanol, methyl ethyl ketone and distilled water, as a result of which a dispersion of a self-dispersing polymer (B-02) having a solids concentration of 26.0% was obtained.

The glass transition temperature of the obtained polymer (B-02) as measured by the following method was 160° C.

An amount of the polymer solution after polymerization, which corresponds to a solids amount of 0.5 g, was taken out, and dried under reduced pressure at 50° C. for 4 hours, as a result of which a polymer solid was obtained. Using the polymer solid obtained, Tg was measured with a differential scanning calorimeter (DSC) EXSTAR6220 manufactured by SII Nano Technology Inc.

(Preparation of Resin-coated Pigment Dispersion 1)

10 parts of pigment red 122 (Cromophthal Jet Magenta DMQ, manufactured by Ciba-Geigy Japan Ltd.; magenta pigment), 4.5 parts of the monomer (M-25/M-27) mixture/methyl methacrylate/methacrylic acid copolymer (water-insoluble resin P-1), 42 parts of methyl ethyl ketone, 4.2 parts of 1M NaOH aqueous solution, and 87.2 parts of ion-exchange water were mixed, subjected to mixing using a disper, and further treated for 10 passes by a disperser (MICROFLUID-IZER M-140K, 150 MPa). Subsequently, methyl ethyl ketone was removed from the obtained dispersion at 55° C. under reduced pressure, and a part of the water was removed, as a result of which a resin-coated pigment dispersion R-1 having a pigment concentration of 10.2% was obtained.

The neutralization degree of the water-insoluble resin was 80%.

—Measurement of Particle Diameter of Resin-coated Pigment—

The obtained resin-coated pigment dispersion was measured with respect to volume average particle diameter by a dynamic light scattering method using a Nanotrac particle size distribution measurement instrument UPA-EX150 (manufactured by NIKKISO CO., LTD.). The measurement was conducted on a measurement sample liquid conditioned at 25° C., which is prepared by adding 10 ml of ion-exchange water to 10 μl of the resin-coated pigment dispersion. As a result of the measurement, the volume average particle diameter of the resin-coated pigment was found to be 82 nm.

<Preparation of Inkjet Ink Composition>

Using the resin-coated pigment dispersion R-1 obtained above, the self-dispersing polymer particles B-02 and sodium silicate (as an alkali-metal silicate salt), ingredients were mixed to form the following ink composition. The resultant composition was filled into a disposable syringe made of plastic, and filtered through a PVDF 5 μm filter (Millex-SV, having a diameter of 25 mm, manufactured by Millipore Corporation), thereby preparing a magenta ink (as an inkjet ink composition) M-1.

—Ink Composition—

| | |
|---|---|
| Resin-coated pigment dispersion R-1: | 40.7 parts |
| Self-dispersing polymer particle dispersion B-02 (solids amount): | 7 parts |
| Urea: | 10 parts |
| Sodium silicate (solids amount): (sodium silicate solution (liquid glass), having a solids concentration of 55%, manufactured by Wako Pure Chemical Industries Ltd.) | 0.01 parts |
| Glycerin: (water-soluble organic solvent manufactured by Wako Pure Chemical Industries Ltd.) | 20 parts |
| Diethylene glycol (DEG): (water-soluble organic solvent manufactured by Wako Pure Chemical Industries Ltd.) | 10 parts |
| OLFINE E1010 (manufactured by Nissin Chemical Industry Co., Ltd., surfactant): | 1 part |
| Ion-exchange water: | Balance (setting the total amount to 100 parts) |

Magenta inks M-02 to M-11 were individually prepared in the same manner as the preparation of the ink composition M-01, except that the urea content, and the type and content of silicate salt were changed as shown in Table 1.

<Preparation of Treatment Liquid>

A treatment liquid was prepared in the following manner.

—Preparation of Treatment Liquid—

Ingredients were mixed to form the following composition, thereby preparing a treatment liquid. In regard to the properties of the treatment liquid, the treatment liquid had a viscosity of 2.6 mPa·s, a surface tension of 37.3 mN/m, and a pH of 1.6 (25° C.).

—Composition of Treatment Liquid—

| | |
|---|---|
| Malonic acid: (divalent carboxylic acid, manufactured by Wako Pure Chemical Industries Ltd.) | 15.0% |
| Diethyleneglycol monomethyl ether: (manufactured by Wako Pure Chemical Industries Ltd.) | 20.0% |
| N-oleoyl-N-methyltaurine sodium salt: (surfactant) | 1.0% |
| Ion-exchange water: | 64.0% |

<Image Formation and Evaluation>

An inkjet head having a silicone nozzle plate similar to that shown in FIG. 1 was prepared, and the contents of a storage tank connected thereto were replaced by the ink composition obtained above. On the surface of the silicone nozzle plate, a liquid repellent film had been formed using a fluorinated alkyl silane compound in advance. A sheet of double-sided TOKUBISHI ART N (manufactured by Mitsubishi Paper Mills Ltd.) as a recording medium was fixed onto a stage that was movable in a predetermined linear direction at 500 mm/sec, and the temperature of the stage was maintained at 30° C. The treatment liquid obtained above was applied, at a thickness of about 1.2 μm, to the recording medium using a bar coater, and was dried at 50° C. for 2 seconds directly after the application.

Thereafter, the inkjet head was set and fixed such that the direction of the alignment of the nozzles of the line head (main scanning direction) forms an angle of 75.7 degrees with a direction that is orthogonal to the movement direction of the stage (sub-scanning direction), and a 2 cm×2 cm square 50% solid image was printed by ejection in a line ejection manner under ejection conditions of an ink droplet volume of 2.4 pL, an ejection frequency of 24 kHz, and a resolution of 1,200 dpi×1,200 dpi while moving the recording medium at a constant velocity in the sub-scanning direction.

Directly after printing, the printed image was dried at 60° C. for 3 seconds, and fixing treatment whereby the recording medium was passed between a pair of fixing rollers heated at 60° C. at a nip pressure of 0.25 MPa and a nip width of 4 mm was conducted, as a result of which an evaluation sample was obtained.

(Maintainability)

After ejection of the ink under the following conditions (1) to (3), the nozzle face of the inkjet head was wiped with a wiper blade (hydrogenated NBR), and thereafter re-ejection properties were evaluated. The quality grade was determined based on the results of the evaluation of the re-ejection properties. Then, maintainability was evaluated according to the following evaluation criteria. The results thereof are shown in FIG. 1.

(1) Wiping with the blade is performed once immediately after the completion of 60-minute continuous ejection, and maintainability is graded acceptable if the ink ejection ratio after the wiping is 90% or higher.

(2) After ejection for 1 minute, ejection is paused for 30 minutes. Wiping with the blade is performed once after the pausing, and maintainability is graded acceptable if the ink ejection ratio after the wiping is 90% or higher.

(3) Wiping with the blade is performed once immediately after the completion of 10-minute ejection, and maintainability is graded acceptable if image unevenness is not observed in an image formed after the wiping.

—Measurement Method of Ink Ejection Ratio—

Ejection from all nozzles was confirmed when starting the test, and the number of ejecting nozzles after completion of the test, including maintenance, was counted, and ejection ratio was calculated as follows.

Ejection ratio (%)=[Number of ejecting nozzles after maintenance]/[Total number of nozzles]×100(%)

Evaluation Criteria

AA: case in which all of the three evaluations are graded acceptable

A: case in which two of the evaluations are graded acceptable

B: case in which only one of the evaluations is graded acceptable

C: case in which all of the three evaluations are graded unacceptable (Ink Stability)

Each of the ink compositions prepared above was temperature-controlled to 25° C. The ink composition in the undiluted state was measured under an environmental conditions of 25° C. and 50% r.h. (relative humidity) using a vibration viscometer (DV-II+VISCOMETER manufactured by Brookfield Engineering Laboratories) and using a cone plate (diameter: 35 mm) at 25° C. An average value of data measured with a torque in the range of from 20 to 90% and a revolution number of from 0.5 to 100 rpm was taken as a measured value. The measured value directly after preparation was named ink viscosity 1.

Then, a part of the ink composition was put in a sample bottle made of glass, and left to stand (stored) in the sealed state for 2 weeks under an environmental condition of 60° C. Thereafter, an ink viscosity 2 after storage was measured in the same manner as the above. Further, the state of the ink liquid was also observed visually.

The change ratio of the ink viscosity measured before and after storage, which is represented by {100−(ink viscosity 2/ink viscosity 1)×100}, was calculated. Ink stability was evaluated according to the following evaluation criteria, further in consideration of the result of the visual observation after storage.

—Evaluation Criteria—

AA: The change ratio of ink viscosity is smaller than ±15%, and a change in the ink is not observed.

A: The change ratio of ink viscosity is from ±15% to less than ±30%, and a change in the ink liquid is not observed.

B: The change ratio of ink viscosity is from ±30% to less than ±50%, and a change in the ink liquid is not observed.

C: The change ratio of ink viscosity is ±50% or larger, or separation or gelation of the ink liquid is observed.

(Ejection Property)

—Evaluation of Ejection Recovery Property and Evaluation of Image Unevenness—

An inkjet head having a silicone nozzle plate similar to that shown in FIG. 1 was fixed such that the direction of the alignment of the nozzles is orthogonal to the movement direction of the stage. Here, the surface of the silicone nozzle plate was provided, in advance, with a liquid repellent film using a fluorinated alkyl silane compound. The contents of a storage tank connected to the inkjet head were replaced by the ink composition prepared above. A recording medium, KASSAI Photofinish Pro manufactured by FUJIFILM Corporation, was attached to a stage, which was movable in a direction that is orthogonal to the nozzle alignment direction of the head.

Then, ejection was performed at an ink droplet volume of 3.4 pL, an ejection frequency of 10 kHz, a resolution of 75 dpi in the nozzle alignment direction, and a resolution of 1,200 dpi in the conveyance direction, while the stage was moved at a velocity of 248 mm/min. The ejection was performed to eject 2,000 ink droplets from each nozzle, so that 96 lines each extending parallel to the conveyance direction were formed, and a print sample A was obtained. Visual observation of the obtained print sample confirmed that the ink was ejected from all nozzles. Further, image unevenness of the print was evaluated by visual observation of the obtained print sample A.

After ink ejection, the head was left to stand as they were for predetermined periods, and new sheets of the recording medium were attached and ejection of the ink was performed under the same conditions as above, thereby preparing print samples. The print samples obtained were visually observed to determine a longest permissible period for standing that allowed ejection from all of the 96 nozzles when 2,000 droplets were ejected after standing for the predetermined time, and the longest period for the standing was used to evaluate ejection property. If the period for standing that does not cause occurrence of ejection failure is longer, ejection property is considered as being more favorable. The ejection recovery property (dummy jet recoverability) was evaluated according to the following criteria.

Here, grade C indicates a practically problematic level.

~Evaluation Criteria~

AA: the longest permissible period for standing is 45 minutes or longer, and image unevenness is not observed A: the longest permissible period for standing is from 30 minutes to less than 45 minutes, and image unevenness is not observed B: the longest permissible period for standing is from 20 minutes to less than 30 minutes, and image unevenness is not observed C: the longest permissible period for standing is less than 20 minutes, or image unevenness is observed (Liquid Repellency)

—Liquid Repellent Film Immersion Test—

A liquid repellent film (SAM film) was formed on a 2 cm×2 cm silicone plate by using a fluorinated alkyl silane compound, thereby preparing a test piece for liquid repellent film immersion test. Using the test piece prepared, the contact angle of water on the liquid repellent film was measured in the following manner, thereby evaluating the effect of the ink composition on the liquid repellency of the liquid repellent film.

30 ml of each of the ink compositions prepared above was weighed, and put in a 50 ml wide-mouth bottle made of polypropylene ("Ai-boy" wide-mouth bottle 50 ml manufactured by AS ONE Corporation). Then, the above test piece was immersed in the ink composition, and left immersed under heating at 60° C. for 72 hours. The test piece was taken out, and washed with ultra-pure water, and the contact angle of water on the liquid repellent film was measured.

The measurement of the contact angle of water was conducted using ultra-pure water and a contact angle measurement instrument (DM-500 manufactured by Kyowa Interface Science Co., Ltd.) under an environment of 25° C. and 50% r.h. according to an ordinary method, and the contact angle of water was evaluated according to the following criteria.

The contact angle of water before immersion in the ink composition is 106.5 degrees, and rank C indicates a practically problematic level.

—Evaluation Criteria—

AA: 80 degrees or larger

A: from 60 degrees to less than 80 degrees

B: from 40 degrees to less than 60 degrees

C: from 20 degrees to less than 40 degrees

D: less than 20 degrees

TABLE 1

| Magenta Ink | Silicate Salt Type | Content (%) | Urea Content (%) | Urea/Silicate Salt | Ink Stability | Ejection Property | Maintainability | Liquid Repellent Property |
|---|---|---|---|---|---|---|---|---|
| M-01 | sodium silicate | 0.01 | 10 | 1,000 | AA | A | A | A |
| M-02 | sodium silicate | 0.1 | 7 | 70 | AA | AA | A | AA |
| M-03 | sodium silicate | 0.5 | 7 | 14 | A | AA | AA | AA |
| M-04 | sodium silicate | 0.1 | 3 | 30 | AA | AA | A | AA |
| M-05 | sodium silicate | 0.1 | 13 | 130 | AA | AA | AA | AA |
| M-06 | sodium silicate | 0.02 | 7 | 350 | AA | AA | A | A |
| M-07 | potassium silicate | 0.1 | 7 | 70 | AA | AA | A | AA |
| M-08 | — | — | 7 | — | AA | AA | A | C |
| M-09 | — | — | 13 | — | A | AA | AA | D |
| M-10 | sodium silicate | 0.1 | — | — | AA | AA | C | A |
| M-11 | tetramethylammonium silicate | 0.1 | 7 | 70 | C | B | A | A |

From Table 1, it is understood that the inkjet ink composition according to the invention provides excellent maintainability, and a reduction in the liquid repellency of inkjet head members can be suppressed when using the inkjet ink composition according to the invention. It is also understood that the inkjet ink composition according to the invention has excellent ink dispersion stability and excellent ejection reliability.

According to the invention, an inkjet ink composition, which has excellent ink stability inkjet head maintainability and with which a reduction in the liquid repellency of inkjet head members is suppressed, an ink set including the inkjet ink composition, and an inkjet image forming method, can be provided.

All publications, patent applications, and technical standards mentioned in this specification are herein incorporated by reference to the same extent as if each individual publication, patent application, or technical standard was specifically and individually indicated to be incorporated by reference.

The invention claimed is:

1. An inkjet ink composition comprising a water-soluble alkali-metal silicate salt, urea, a colorant and water, wherein a content ratio of the urea to the water-soluble alkali-metal silicate salt (urea/alkali-metal silicate salt) is from 5 to 1000.

2. The inkjet ink composition according to claim 1, wherein the alkali-metal silicate salt is represented by the following Formula (S):

$$x(M_2O) \cdot y(SiO_2) \quad (S)$$

wherein, in Formula (S), M represents sodium or potassium, x represents 1 or 2, and y represents an integer of from 1 to 4.

3. The inkjet ink composition according to claim 1, wherein the colorant is a pigment that has been covered with a water-insoluble resin using a phase inversion emulsification method.

4. The inkjet ink composition according to claim 1, wherein a content of the alkali-metal silicate salt is from 0.0001% by mass to 3.0% by mass relative to an entire mass of the inkjet ink composition.

5. The inkjet ink composition according to claim 1, wherein the inkjet ink composition has a pH value of from 7.5 to 10.0 at 25° C.

6. The inkjet ink composition according to claim 1, wherein a content of the urea is from 1% by mass to less than 15% by mass relative to an entire mass of the inkjet ink composition.

7. The inkjet ink composition according to claim 1, further comprising resin particles.

8. The inkjet ink composition according to claim 7, wherein the resin particles are self-dispersing polymer particles.

9. The inkjet ink composition according to claim 1, wherein the alkali-metal silicate salt is at least one selected from sodium silicate or potassium silicate, and a total content of sodium silicate and potassium silicate is from 0.001% by mass to 0.2% by mass relative to an entire mass of the inkjet ink composition.

10. The inkjet ink composition according to claim 1, wherein a content of the alkali-metal silicate salt is from 0.03% by mass to 0.2% by mass relative to an entire mass of the inkjet ink composition, and a content of the urea is from 3.0% by mass to 10% by mass relative to the entire mass of the inkjet ink composition.

11. The inkjet ink composition according to claim 1, wherein a content ratio of the urea to the water-soluble alkali-metal silicate salt (urea/alkali-metal silicate salt) is from 20 to 200.

12. An ink set comprising the inkjet ink composition of claim 1, and a treatment liquid capable of forming an aggregate when contacting the inkjet ink composition.

13. An inkjet image forming method comprising an ink ejection process of ejecting the inkjet ink composition of claim 1 from an inkjet head equipped with a silicone nozzle plate onto a recording medium, to form an image.

14. The inkjet image forming method according to claim 13, further comprising a treatment liquid application process of applying a treatment liquid, which is capable of forming an aggregate when contacting the inkjet ink composition, onto the recording medium.

15. The inkjet ink composition according to claim 1, wherein the colorant is a pigment that has been covered with a water-insoluble resin using a phase inversion emulsification method, and a content of the alkali-metal silicate salt is from 0.0001% by mass to 3.0% by mass relative to an entire mass of the inkjet ink composition.

16. An inkjet ink composition comprising a water-soluble alkali-metal silicate salt, urea, a colorant and water, wherein the colorant is a pigment that has been covered with a water-insoluble resin using a phase inversion emulsification method.

17. The inkjet ink composition according to claim 16, wherein a content of the alkali-metal silicate salt is from 0.03% by mass to 0.2% by mass relative to an entire mass of the inkjet ink composition, a content of the urea is from 3.0% by mass to 10% by mass relative to the entire mass of the inkjet ink composition, and a content ratio of the urea to the water-soluble alkali-metal silicate salt (urea/alkali-metal silicate salt) is from 20 to 200.

18. An ink set comprising the inkjet ink composition of claim 16, and a treatment liquid capable of forming an aggregate when contacting the inkjet ink composition.

19. An inkjet ink composition comprising a water-soluble alkali-metal silicate salt, urea, a colorant and water, wherein a content of the alkali-metal silicate salt is from 0.03% by mass to 0.2% by mass relative to an entire mass of the inkjet ink composition, and a content of the urea is from 3.0% by mass to 10% by mass relative to the entire mass of the inkjet ink composition.

20. The inkjet ink composition according to claim 19, wherein a content ratio of the urea to the water-soluble alkali-metal silicate salt (urea/alkali-metal silicate salt) is from 20 to 200.

21. The inkjet ink composition according to claim 19, the colorant is a pigment that has been covered with a water-insoluble resin using a phase inversion emulsification method.

22. An ink set comprising the inkjet ink composition of claim 19, and a treatment liquid capable of forming an aggregate when contacting the inkjet ink composition.

* * * * *